US008811683B2

(12) United States Patent
Zimmer

(10) Patent No.: US 8,811,683 B2
(45) Date of Patent: Aug. 19, 2014

(54) AUTOMATIC RED-EYE REPAIR USING MULTIPLE RECOGNITION CHANNELS

(75) Inventor: Mark Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 13/182,546

(22) Filed: Jul. 14, 2011

(65) Prior Publication Data

US 2012/0308132 A1 Dec. 6, 2012

Related U.S. Application Data

(60) Provisional application No. 61/492,698, filed on Jun. 2, 2011.

(51) Int. Cl.
*G06K 9/00* (2006.01)
(52) U.S. Cl.
CPC .......................................... *G06K 9/00* (2013.01)
USPC ............ 382/117; 382/118; 382/167; 382/275
(58) Field of Classification Search
CPC ....... H04N 1/622; H04N 1/624; H04N 5/367; H04N 13/0037; G06T 2207/30041; G06T 2207/30216; G06T 5/005; G06T 7/408; G06T 7/0085; G06T 2207/10024; G06K 9/00234; G06K 9/0061; G09G 5/02; G09G 2320/0666; G01J 3/46
USPC .................................. 382/117, 118, 167, 275
See application file for complete search history.

(56) References Cited

U.S. PATENT DOCUMENTS

| | | | |
|---|---|---|---|
| 4,100,554 | A | 7/1978 | Iijima |
| 5,130,789 | A | 7/1992 | Dobbs |
| 5,432,863 | A | 7/1995 | Benati |
| 5,579,082 | A | 11/1996 | Yokonuma |

(Continued)

FOREIGN PATENT DOCUMENTS

| | | |
|---|---|---|
| RU | 2320011 | 3/2008 |
| RU | 2324225 | 5/2008 |
| WO | 9917254 | 4/1999 |

OTHER PUBLICATIONS

"AdaBoost", Wikipedia, 4 pgs, http://en.wikipedia.org/wiki/Adaboost, page last modified on Mar. 20, 2014.

(Continued)

*Primary Examiner* — Vu Le
*Assistant Examiner* — Aklilu Woldemariam
(74) *Attorney, Agent, or Firm* — Wong, Cabello, Lutsch, Rutherford & Brucculeri, LLP

(57) ABSTRACT

This disclosure pertains to apparatuses, methods, and computer readable media for automatic red-eye repair using multiple recognition channels. While it is possible to manually specify all of the eyes in an image to be repaired, it is desirable for repair to happen automatically. Since red-eye repair algorithms are dependent upon knowing the image position and size of each artifact to be repaired, in an automatic repair mode, the algorithm must be directed as to where the repair should be applied. Face detection is one way to determine eye positions and the interocular distance (IOD) with some degree of certainty. In some embodiments, red, golden, and white recognition channels may be used to locate and determine the type of the artifacts. Once an artifact has been characterized by, e.g., type, size, and location, the techniques disclosed herein may then repair the artifact, replacing it with a photographically reasonable result.

28 Claims, 25 Drawing Sheets

(56) References Cited

U.S. PATENT DOCUMENTS

| | | | |
|---|---|---|---|
| 5,708,866 A | 1/1998 | Leonard | |
| 5,748,764 A | 5/1998 | Benati | |
| 5,822,624 A | 10/1998 | Fukuhara | |
| 5,850,470 A * | 12/1998 | Kung et al. | 382/157 |
| 5,950,023 A | 9/1999 | Hara | |
| 6,009,209 A | 12/1999 | Acker | |
| 6,016,354 A | 1/2000 | Lin | |
| 6,047,138 A | 4/2000 | Teremy | |
| 6,204,858 B1 | 3/2001 | Gupta | |
| 6,252,976 B1 | 6/2001 | Schildkraut | |
| 6,278,491 B1 | 8/2001 | Wang | |
| 6,285,410 B1 * | 9/2001 | Marni | 348/576 |
| 6,292,574 B1 | 9/2001 | Schildkraut | |
| 6,407,777 B1 | 6/2002 | DeLuca | |
| 6,631,208 B1 | 10/2003 | Kinjo | |
| 6,728,401 B1 | 4/2004 | Hardeberg | |
| 6,885,766 B2 | 4/2005 | Held | |
| 6,895,112 B2 | 5/2005 | Chen | |
| 6,980,691 B2 | 12/2005 | Nesterov | |
| 7,024,035 B1 | 4/2006 | Enomoto | |
| 7,116,820 B2 * | 10/2006 | Luo et al. | 382/167 |
| 7,155,058 B2 | 12/2006 | Gaubatz | |
| 7,174,034 B2 | 2/2007 | OCallaghan | |
| 7,224,850 B2 * | 5/2007 | Zhang et al. | 382/275 |
| 7,295,686 B2 | 11/2007 | Wu | |
| 7,298,380 B2 | 11/2007 | Yoshida | |
| 7,333,653 B2 | 2/2008 | Luo | |
| 7,336,821 B2 | 2/2008 | Ciuc | |
| 7,343,028 B2 | 3/2008 | Ioffe | |
| 7,403,654 B2 | 7/2008 | Wu | |
| 7,415,165 B2 * | 8/2008 | Itagaki et al. | 382/282 |
| 7,587,085 B2 | 9/2009 | Steinberg | |
| 7,599,577 B2 | 10/2009 | Ciuc | |
| 7,675,652 B2 | 3/2010 | Demandolx | |
| 7,747,160 B2 | 6/2010 | Thorn | |
| 7,768,535 B2 | 8/2010 | Reid | |
| 7,853,048 B2 | 12/2010 | Kakiuchi | |
| 7,880,783 B2 * | 2/2011 | Irie | 348/248 |
| 7,978,909 B2 | 7/2011 | Umeda | |
| 8,184,900 B2 * | 5/2012 | Ciuc et al. | 382/162 |
| 8,260,082 B2 | 9/2012 | Rhoda | |
| 8,345,970 B2 | 1/2013 | Hang | |
| 8,351,736 B2 | 1/2013 | Demandolx | |
| 8,547,457 B2 | 10/2013 | Wolfe | |
| 2002/0126893 A1 | 9/2002 | Held | |
| 2002/0176623 A1 * | 11/2002 | Steinberg | 382/165 |
| 2003/0007687 A1 | 1/2003 | Nesterov | |
| 2003/0044178 A1 | 3/2003 | Oberhardt | |
| 2003/0068084 A1 | 4/2003 | Kinjo | |
| 2004/0213476 A1 | 10/2004 | Luo | |
| 2005/0232481 A1 | 10/2005 | Wu | |
| 2005/0238230 A1 | 10/2005 | Yoshida | |
| 2006/0098867 A1 * | 5/2006 | Gallagher | 382/167 |
| 2006/0129950 A1 | 6/2006 | Zhao | |
| 2006/0204052 A1 * | 9/2006 | Yokouchi | 382/117 |
| 2007/0036438 A1 * | 2/2007 | Thakur | 382/190 |
| 2007/0140446 A1 | 6/2007 | Haldeman | |
| 2007/0252906 A1 | 11/2007 | Ulichney | |
| 2008/0002060 A1 | 1/2008 | DeLuca | |
| 2008/0049970 A1 * | 2/2008 | Ciuc et al. | 382/100 |
| 2008/0112599 A1 * | 5/2008 | Nanu et al. | 382/117 |
| 2008/0112613 A1 | 5/2008 | Luo | |
| 2008/0137944 A1 * | 6/2008 | Marchesotti et al. | 382/167 |
| 2008/0212843 A1 | 9/2008 | Rhoda | |
| 2010/0008567 A1 | 1/2010 | Kakiuchi | |
| 2010/0053362 A1 | 3/2010 | Nanu | |
| 2010/0177960 A1 | 7/2010 | Hang | |
| 2011/0002506 A1 | 1/2011 | Ciuc | |
| 2011/0102643 A1 | 5/2011 | Nanu | |
| 2011/0158511 A1 * | 6/2011 | Messina et al. | 382/159 |
| 2012/0020557 A1 | 1/2012 | Gaubatz | |
| 2012/0242681 A1 | 9/2012 | Zimmer | |
| 2012/0242861 A1 | 9/2012 | Zimmer | |
| 2012/0243780 A1 | 9/2012 | Zimmer | |
| 2012/0243783 A1 | 9/2012 | Zimmer | |

OTHER PUBLICATIONS

"Red-eye effect", Wikipedia, 4 pgs., http://en.wikipedia.org/wiki/Red-eye_effect, page last modified on Mar. 20, 2014.

Battiato, S. et al., "Red-Eyes Removal Through Cluster Based Linear Discriminant Analysis", Proceedings of 2010 IEEE 17th International Conference on Image Processing, pp. 2185-2188, Sep. 26-29, 2010.

Chang et al.; "Automatic Detection and Correction for Glossy Reflections in Digital Photograph"; Ubi-media Computing (U-Media) IEEE International Conference on; Jul. 5-6, 2010, pp. 44-49.

Cuff, Paul, "Automatic Identification of Red-Eye in Photos", Department of Electrical Engineering, Stanford University, 3 pgs, 2006, available at http://cs229.stanford.edu/proj2006/Cuff-AutomaticIdentificationOfRedEyeInPhotos.pdf.

Gasparini, Francesca et al., "A Review of Redeye Detection and Removal in Digital Images Through Patents"; Recent Patents on Electrical Engineering, Jan. 2009, vol. 2(1), pp. 45-53.

Gimp.org, "Red Eye Removal", 2 pgs., http://docs.gimp.org/en/plug-in-red-eye-removal.html, available Dec. 2, 2007.

Jeschke, Eric, "Script to Implement Red-Eye Removal Technique", Linux Journal, 5pgs. http://www.linuxjournal.com/article/6567, Jan. 13, 2003.

Kimball, Spencer et al., "The GIMP—an image manipulation program", 3 pgs., http://ericjeschke.com/download/gimpguru/scripts/red-eye.scm, 1995, last updated Oct. 6, 2002.

Luo, Huitao et al., "An Efficient Automatic Redeye Detection and Correction Algorithm", Hewlett-Packard Labs, 4pgs, Sep. 20, 2004.

Miao, Xioa-Ping et al., "Automatic Red-Eye Detection and Removal", School of Computing National University of Singapore, 5 pgs, Feb. 22, 2005.

Safanov, Ilia V., "Automatic red eye detection", Samsung Research Center, Moscow Russia, 8 pgs, GrahiCon, Jun. 23-27, 2007.

Spears, Carol, Gimp.org Tutorials, "Red Eye Removal", 5 pgs., http://www.gimp.org/tutorials/Red_Eye_Removal, 2002, accessed on Mar. 20, 2014.

Using Adobe Photoshop CS4, "Remove Red Eye", p. 207, available at http://help.adobe.com/archive/en_US/photoshop/cs4/photoshop_cs4_help.pdf, 2009, last updated Jan. 10, 2010.

Volken, Flavien et al., "Automatic Red-Eye Removal based on Sclera and Skin Tone Detection", Society for Imaging Science and Technology, pp. 359-364, Jun. 2006.

Zhang, Lei et al., "Automated Red-Eye Detection and Correction in Digital Photographs", Microsoft Research Asia, 4pgs, Apr. 18, 2005.

* cited by examiner

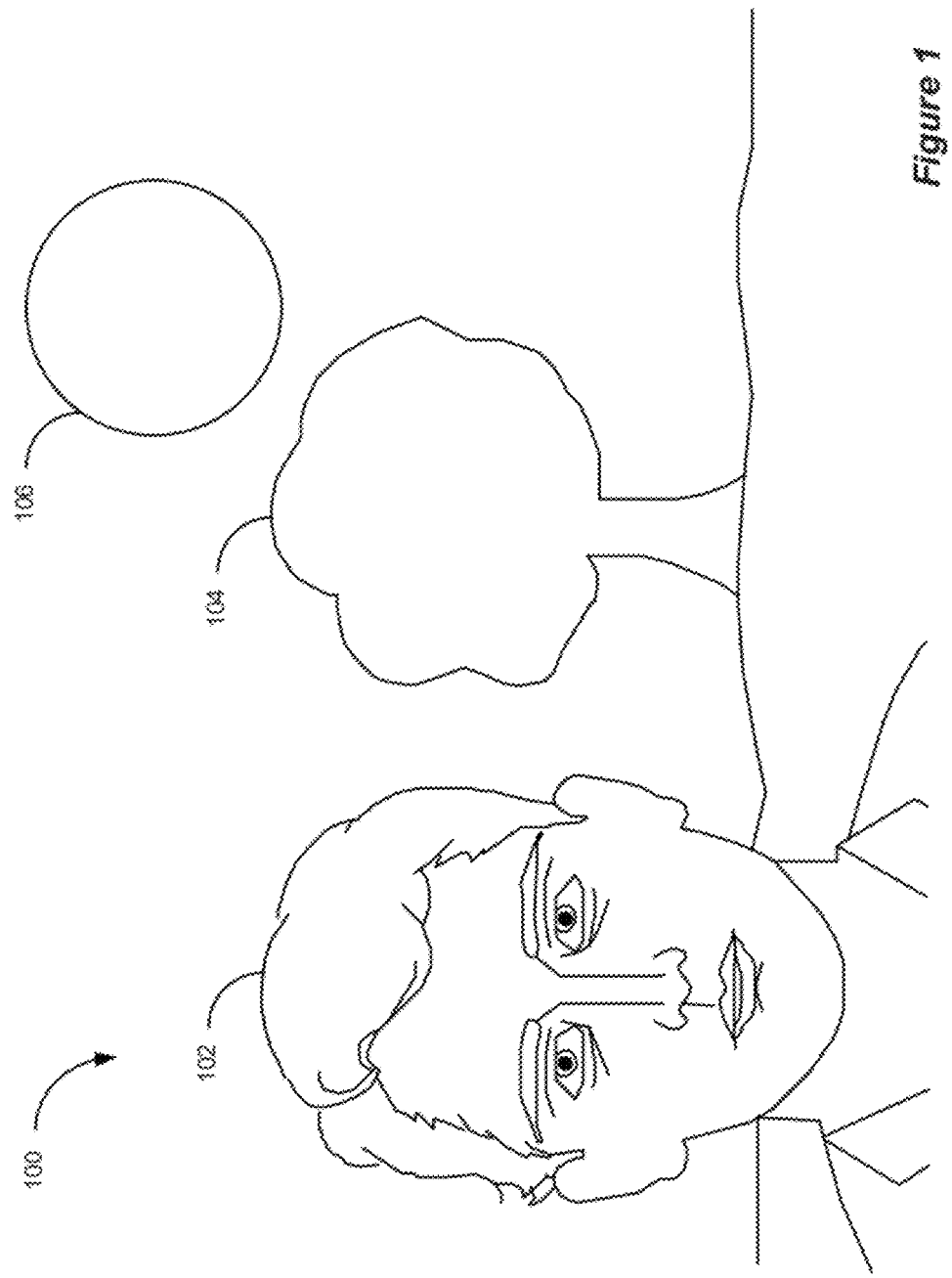

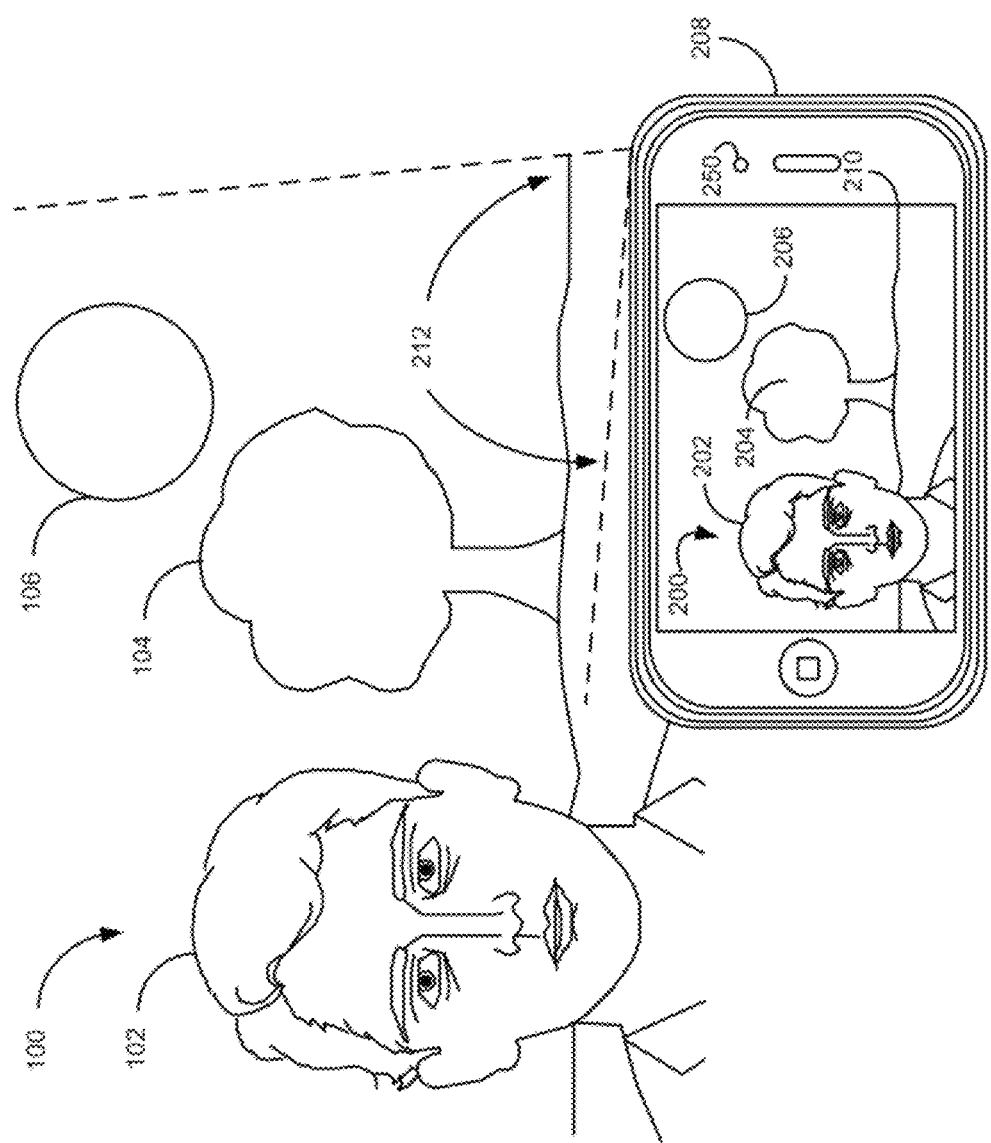

AUTOMATIC RED-EYE REPAIR USING MULTIPLE RECOGNITION CHANNELS

CROSS-REFERENCE TO RELATED APPLICATIONS

This application claims priority to U.S. Provisional Application Ser. No. 61/492,698, filed Jun. 2, 2011, entitled, "Automatic Red-Eye Repair Using Multiple Recognition Channels." This application is also related to commonly-assigned applications with U.S. patent application Ser. Nos. 13/053,071, 13/053,086, 13/053,121, 13/053,124, and 13/053,131, each of which applications is entitled, "Red-eye Removal Using Multiple Recognition Channels," each of which was filed Mar. 21, 2011, and each of which is hereby incorporated by reference in its entirety.

BACKGROUND

The disclosed embodiments relate generally to red-eye repair techniques, and more particularly, to specific characterization, discernment, and repair techniques utilizing multiple recognition channels (e.g., red, golden, and white recognition channels). In certain embodiments, the red-eye repair techniques may be applied to an image automatically with limited or no input from a user.

In photography, red-eye is the occurrence of glowing red pupils in a color photograph due to eye shine. Red-eye is believed to be caused by the red reflection of the blood vessels in the retina when a strong and sudden light strikes the eye. The tonality and intensity of red-eye may vary from person to person based on ethnicity, pigmentation levels, and other factors. Today's compact digital cameras commonly used in embedded systems exacerbate the problem of red-eye artifacts because of the proximity of the camera's flash unit and the lens. One common technique to mitigate red-eye is to use multiple flashes to contract the pupils before capturing the final image. However, this provides incomplete red-eye reduction, lengthens the amount of time needed to capture the final image, and presents more of a drain on the camera device's power source.

Other techniques that attempt to programmatically mitigate red-eye only work well when red-eye artifacts are actually predominantly red in color and/or are present in familiar orientations and shapes, i.e., front-facing and circular. Still other existing red-eye repair techniques use red-eye replacement techniques that are overly simplified, often resulting in jagged pupils or solid black pupils that may actually make the photo look more unnatural and less realistic than the original, unaltered photo with red-eye artifacts.

In addition to red artifacts, the inventor has noticed that the color of a "red-eye" may also be golden (i.e., a mixture of various degrees of red, orange, yellow, and white), or even pure white. This condition can occur, e.g., when photographing faces using a strong light source such as a flash that exists at a small displacement from the lens, and most often when the pupil is wide open. While the return signal from a red-eye artifact has a predominantly red hue, the hue can be altered by the color filter array chromaticities in the camera image sensor, and the color may also be distorted by erroneous clipping of the image's red, green, and blue signals during color processing. This artifact can be exacerbated by the gain factors required in low-light situations in which the flash is required. Further, artifacts may come in a variety of shapes, sizes, and overlapping topological layers. Specular shine, i.e., the reflection of light off the cornea or sclera (i.e., the whites of the eyes), is another aspect that may be considered in red-eye repair and replacement to achieve photographically reasonable results.

Accordingly, there is a need for techniques to implement a programmatic solution to red-eye repair that is robust enough to handle a large number of red-eye cases and color types automatically. By discerning between red, golden, and white eye artifacts, and locating and characterizing human faces in an image, for example, more specific automatic repair techniques may be employed to achieve photographically reasonable results.

SUMMARY

The automatic red-eye repair techniques disclosed herein are designed to handle a range of red-eye cases from, for example, Xenon and LED flashes. The user interface (UI) for automatically fixing a red-eye according to one embodiment is designed to be straight-forward: the user indicates a desire to capture an image, and the repair process automatically locates and characterizes the red-eye artifacts and then repairs the artifacts, if possible. Steps may then be used to accomplish the automatic red-eye removal process include, but are not necessarily limited to characterization of candidate artifacts, selection of candidate artifacts for repair (based on, e.g., a confidence measure assigned to the candidate artifact), repair generation, and evaluation of the generated repair (based on, e.g., a confidence measure assigned to the generated repair). Each of these steps will be described in detail below.

In one embodiment described herein, an automatic artifact repair method comprises: receiving face location information for a face in an image, the face location information comprising two eye points, the image stored in a memory; automatically identifying a candidate artifact for a first eye in the face, the first eye associated with a first of the two eye points; automatically generating a candidate repair for the candidate artifact based, at least in part, on the face location information; automatically determining a confidence measure for the candidate repair based, at least in part, on the face location information; automatically applying the candidate repair to the image stored in the memory if the confidence measure is greater than a threshold value; and automatically rejecting the candidate repair if the confidence measure is less than the threshold value. In addition, a portion of a face may be extracted based (at least in part) on the face location information. The extracted portion of the image may be used to determine the average luminance and contrast of the face. This, in turn, may be used to determine a likely shade for the repaired eye's pupil.

In another embodiment described herein, an automatic artifact repair method comprises: receiving face location information for a face in an image, the face location information comprising two eye points, the image stored in a memory; automatically identifying a candidate artifact for a first eye in the face, the first eye associated with a first of the two eye points; automatically generating a candidate repair for the candidate artifact based, at least in part, on the face location information; automatically determining a confidence measure for the candidate repair based, at least in part, on the face location information; automatically determining a validity measure for the candidate repair based, at least in part, on the face location information; automatically applying the candidate repair to the image stored in the memory if the confidence measure is greater than a confidence threshold value and the validity measure is greater than a validity threshold value; and automatically rejecting the candidate repair if either the confidence measure is less than the confidence threshold value or the validity measure is less than the validity threshold value. The validity measure for the candidate repair may be based, at least in part, on any one or more of the following: a repair size value, a repair strength value, an average repair contrast value, and a repair distance from corresponding eye point value.

In yet another embodiment described herein, an automatic artifact repair method comprises: receiving face location information for a face in an image, the face location information comprising two eye points and an interocular distance (IOD), the image stored in a memory; automatically determining a search region around the location of the two eye points; determining a plurality of recognition channels over the search region; automatically identifying prospective prominence locations over the search region for each of the plurality of recognition channels; automatically evaluating a measure for each of the prospective prominence locations in each of the plurality of recognition channels; automatically selecting the prominence location with the greatest measure for a first one of the plurality of recognition channels; automatically generating a first candidate repair for the selected prominence location from the first recognition channel; automatically determining a first confidence measure for the first candidate repair; automatically applying the first candidate repair to the image stored in the memory if the first confidence measure is greater than a first threshold value; and automatically rejecting the first candidate repair if the first confidence measure is less than the first threshold value.

Automatic red-eye repair techniques in accordance with the various embodiments described herein may be implemented directly by a device's hardware and/or software, thus making these robust red-eye repair techniques readily applicable to any number of electronic devices, such as mobile phones, personal data assistants (PDAs), portable music players, monitors, televisions, as well as laptop, desktop, and tablet computer systems. Those aspects implemented in software may be coded in any desired language (e.g., assembly language, C, or C++) and organized into one or more modules. The modules may be stored in a non-transitory program storage device such as, for example, a magnetic disk drive or non-volatile random access memory.

BRIEF DESCRIPTION OF THE DRAWINGS

FIG. 1 illustrates a typical outdoor scene with a human subject, in accordance with one embodiment.

FIG. 2 illustrates a typical outdoor scene with a human subject as viewed on a camera device's preview screen, in accordance with one embodiment.

DETAILED DESCRIPTION

Figure 3A:
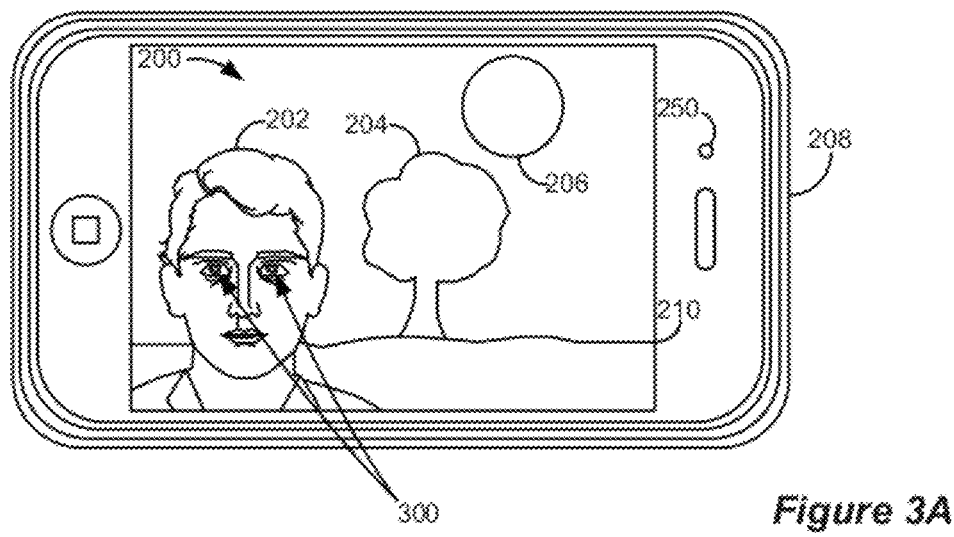
FIG. 3A illustrates a photo on a camera device's preview screen having red-eye artifacts, in accordance with one embodiment.

This disclosure pertains to apparatuses, methods, and computer readable media for automatic red-eye repair using multiple recognition channels. In the following examples, red, golden and white recognition channels are used. A recognition channel is the monochrome extraction from a color photograph in a manner designed to make one kind of red-eye artifact exhibit maximum contrast. Each recognition channel may have its own specific extraction methodology. While it is possible to manually specify all of the eyes in an image to be repaired, in some embodiments, it is desirable for repair to happen automatically. Since red-eye repair algorithms are dependent upon knowing the position and size of each artifact to be repaired, in an automatic repair mode, the algorithm needs to first determine where the repair should be applied. Face detection is one way to determine eye position and the interocular distance (IOD) with some degree of certainty. In some embodiments, red, golden, and white recognition channels may be used to locate and determine the type of the artifacts. Once an artifact has been characterized by, e.g., type, size, and location, the techniques disclosed herein may then repair the artifact, replacing it with a photographically reasonable result. Specular reflection may also be re-added to the image. It is desirable that the automatic repair to red-eye artifacts only apply to actual red-eye artifacts and not, say, to an area of the face or eyelid. It is also desirable that, when automatic repair is not successful or fails to produce a result, the user be allowed to manually undo a repair or specify an additional repair.

The techniques disclosed herein are applicable to any number of electronic devices with optical sensors such as digital cameras, digital video cameras, mobile phones, personal data assistants (PDAs), portable music players, monitors, televisions, and, of course, desktop, laptop, and tablet computer systems.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Referring now to FIG. 1, a typical outdoor scene 100 with a human subject 102 is shown, in accordance with one embodiment. The scene 100 also includes the Sun 106 and a natural object, tree 104. Scene 100 will be used in the subsequent figures as an exemplary scene to illustrate the various age processing techniques described herein.

Referring now to FIG. 2, a typical outdoor scene 200 with a human subject 202 as viewed on a camera device 208's preview screen 210 is shown, in accordance with one embodiment. The dashed lines 212 indicate the viewing angle of the camera (not shown) on the reverse side of camera device 208. Camera device 208 may also possess a second camera, such as front-facing camera 250. Other numbers and positions of cameras on camera device 208 are also possible. As mentioned previously, although camera device 208 is shown here as a mobile phone, the teachings presented herein are equally applicable to any electronic device possessing a camera, such as, but not limited to: digital video cameras, personal data assistants (PDAs), portable music players, laptop/desktop/tablet computers, or conventional digital cameras. Each object in the scene 100 has a corresponding representation in the scene 200 as viewed on a camera device 208's preview screen 210. For example, human subject 102 is represented as object 202, tree 104 is represented as object 204, and Sun 106 is represented as object 206.

Referring now to FIG. 3A, a photo on a camera device's preview screen 210 having red-eye artifacts 300 is shown, in accordance with one embodiment. As shown in FIG. 3A, the pupil of each eye 300 is replaced with a cross-hatched pattern to represent a red-eye or other artifact occurring in place of a natural looking, dark pupil, as is seen in the human subject in FIG. 1.

Figure 3B:
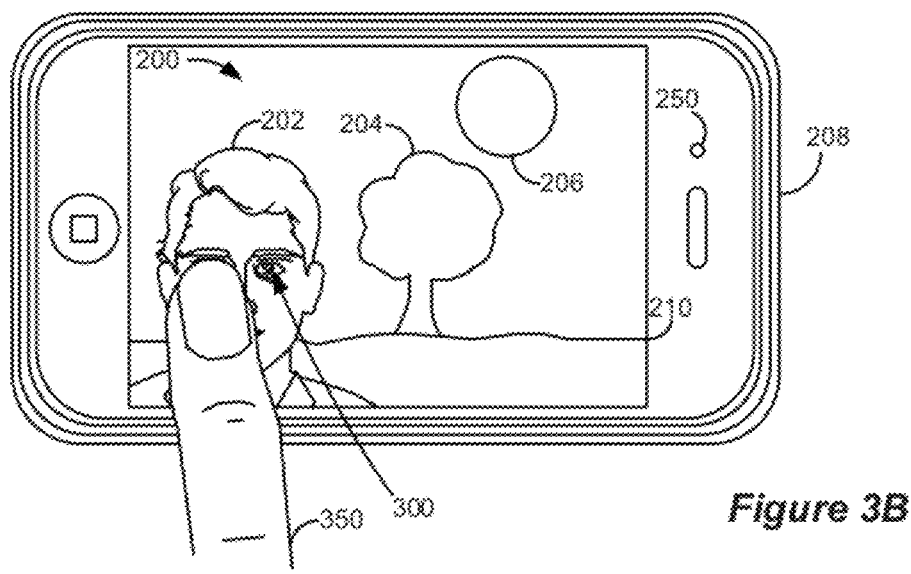
FIG. 3B illustrates a user interacting with a camera device via a touch gesture to provide manual user input to the red-eye repair process, in accordance with one embodiment.

In some embodiments described herein, a user may manually specify, via some form of user input, e.g., a touch gesture, a location in the image wherein the red-eye repair process may be concentrated. In other embodiments, as will be discussed later, the decision of where in the image to apply the red-eye repair process may be made programmatically and automatically, aided by, e.g., a face detection algorithm or other process returning information regarding the position and size of eyes in the image. Referring now to FIG. 3B, a user 350 interacting with a camera device 208 via an exemplary touch gesture to provide manual user input to the red-eye repair process is shown, in accordance with one embodiment. The preview screen 210 of camera device 208 may be, for example, a touch screen. The touch-sensitive touch screen 210 provides an input interface and an output interface between the device 208 and the user 350. The touch screen 210 displays visual output to the user. The visual output may include graphics, text, icons, pictures, video, and any combination thereof.

A touch screen such as touch screen 210 has a touch-sensitive surface, sensor or set of sensors that accepts input from the user based on haptic and/or tactile contact. The touch screen 210 detects contact (and any movement or breaking of the contact) on the touch screen 210 and converts the detected contact into interaction with user-interface objects (e.g., one or more soft keys, icons, web pages, images or portions of images) that are displayed on the touch screen. In an exemplary embodiment, a point of contact between a touch screen 210 and the user corresponds to a finger of the user 350 at a location substantially coincident with red-eye artifacts 300.

The touch screen 210 may use LCD (liquid crystal display) technology, or LPD (light emitting polymer display) technology, although other display technologies may be used in other embodiments. The touch screen 210 may employ any of a plurality of touch sensing technologies now known or later developed, including but not limited to capacitive, resistive, infrared, and surface acoustic wave technologies, as well as other proximity sensor arrays or other elements for determining one or more points of contact with a touch screen 210.

The touch screen 210 may have a resolution in excess of 300 dots per inch (dpi). In an exemplary embodiment, the touch screen has a resolution of approximately 325 dpi. The user 350 may make contact with the touch screen 210 using any suitable object or appendage, such as a stylus, a finger, and so forth. In some embodiments, the user interface is designed to work primarily with finger-based contacts and gestures, which typically have larger areas of contact on the touch screen than stylus-based input. In some embodiments, the device translates the rough finger-based gesture input into a precise pointer/cursor coordinate position or command for performing the actions desired by the user 350.

Figure 4A:
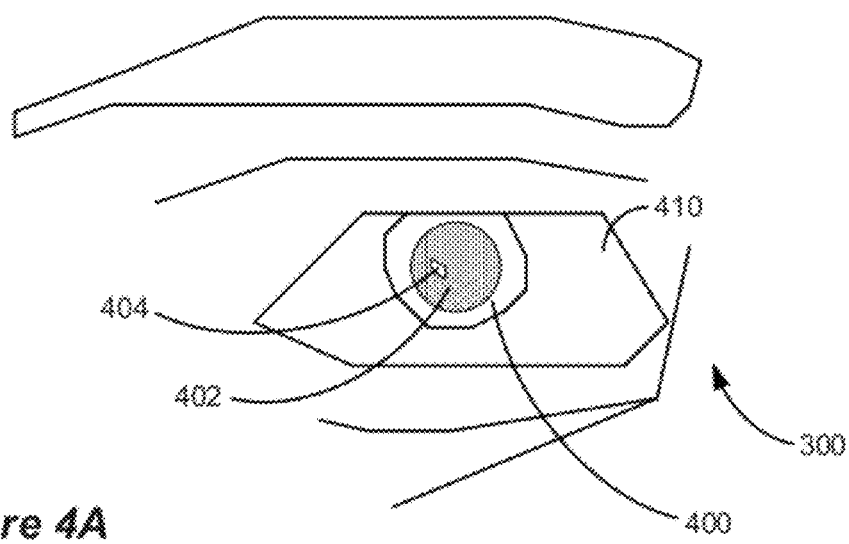
FIG. 4A illustrates a close-up view of a red-eye artifact with specular reflection, in accordance with one embodiment.
Figure 4B:
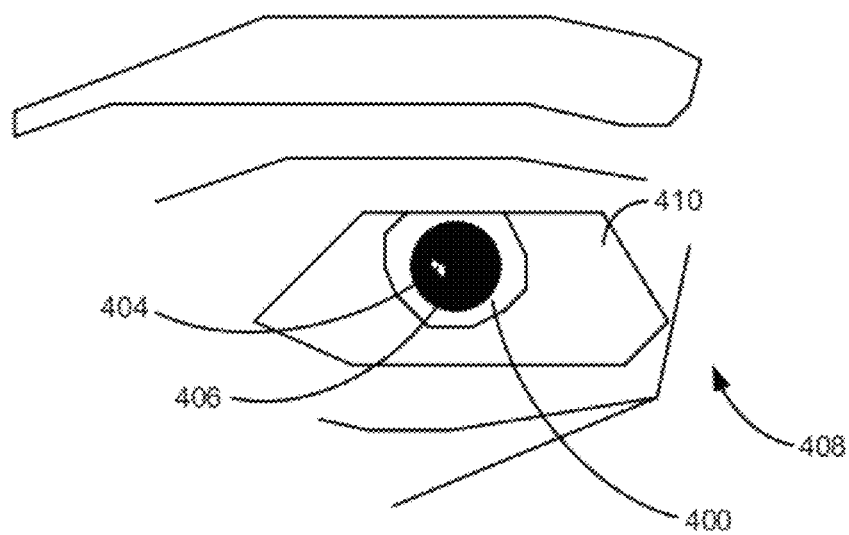
FIG. 4B illustrates a close-up view of a corrected red-eye artifact with specular reflection, in accordance with one embodiment.

As shown in greater detail in FIG. 4A, a typical red eye 300 comprises an iris 400, the sclera 410 (i.e., the whites of the eyes), a pupil 402 containing a red-eye artifact, and potentially specular shine 404. The shading of pupil 402 is indicative of the red eye artifact in FIG. 4A. As shown, in FIG. 4B, a corrected red-eye 408 replaces artifact-containing pupil 402 with a more natural looking solid black pupil 406 while maintaining the specular shine 404.

Figure 5:
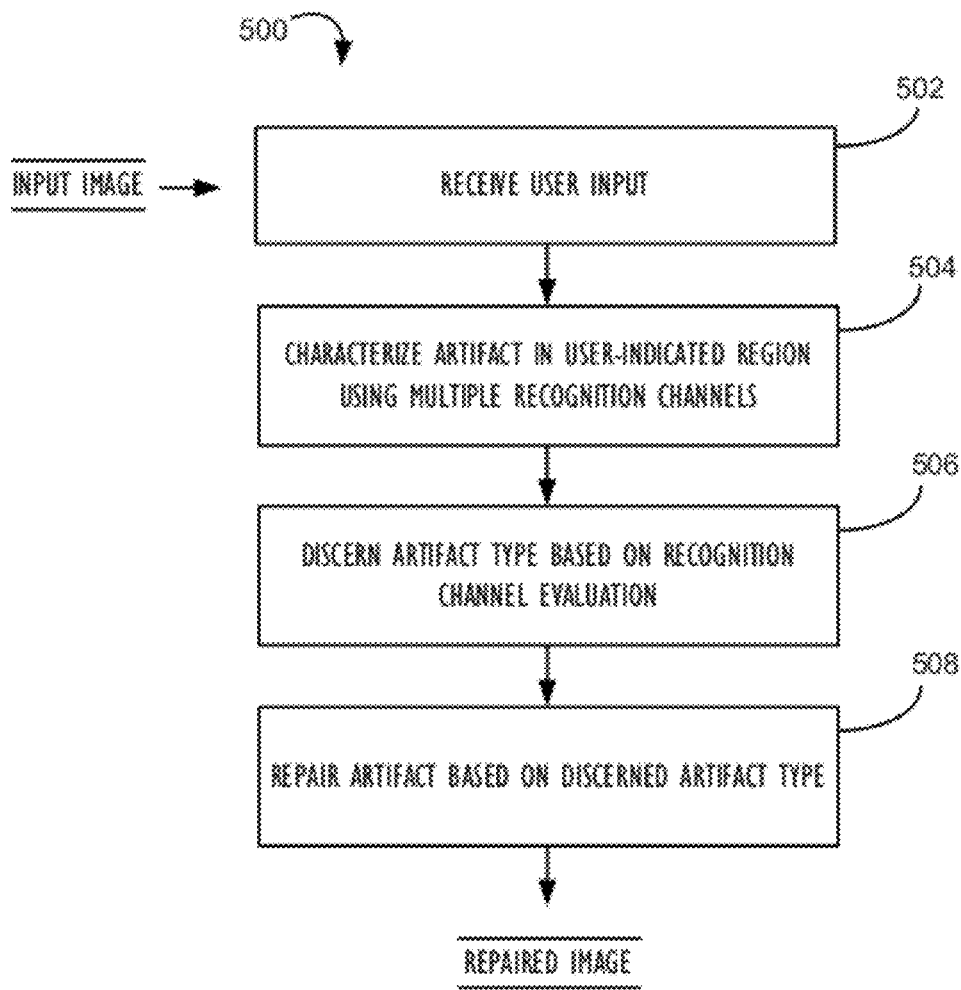
FIG. 5 illustrates a high-level process for red-eye artifact removal, in accordance with one embodiment.

The general steps involved in one embodiment of a manual red-eye artifact removal process 500 using multiple channels are shown in flowchart form in FIG. 5. Process 500 begins by receiving an input image, and then user input may be received indicating the likely location of the red-eye artifact (Step 502). Next, process 500 may characterize the artifact in the user indicated region of the image by using multiple recognition channels, e.g., red, golden, and white recognition channels (Step 504). Next, process 500 may discern what type the artifact is based on evaluating the multiple recognition channels (Step 506). Finally, process 500 may repair the red-eye artifact based on the discerned artifact type (Step 508), resulting in a repaired image. Each of the major parts of process 500, i.e., the characterization, discernment, and repair steps, are described separately and in greater detail below.

I. Characterization

When the user taps near a red-eye artifact in a photograph, it can be determined with some degree of certainty whether a prominence of some character occurs at or near that spot. With automatic repair techniques, however, some other process, e.g., face detection algorithms, may be employed to provide the red-eye repair process with some initial information regarding the likely location of a prominence. When face detection is inaccurate, it may become necessary to find the red-eye artifacts (prominences) by using a search. When the eye in question does not contain a red-eye artifact, it may also be necessary to prevent the eye from becoming repaired erroneously. Thus, a rejection criterion may be used. In addition to the location of the prominence, the size of the prominence may be determined. To do this, one embodiment of a characterization process employs: recognition channels, a size-independent snap-to method, and a seed-fill-based approximate characterization of the prominence, using a breakout method. This is done for all three recognition channels, e.g., the red, golden, and white channels.

Recognition Channels

A recognition channel is the monochrome extraction from a color photograph using a technique designed to make one kind of red-eye artifact glow with maximum contrast. One function of a recognition channel may be to produce a prominence in the monochrome channel that shows the entire area of the artifact that is to be cancelled. It is beneficial if the prominence has enough contrast that it can be isolated from its neighborhood of surrounding pixels that are not part of the prominence.

As previously noted, for illustrative purposes, three kinds of recognition channels are described: red, golden, and white. Each channel has its own specific technique for determining the monochrome value of the channel.

Red

Classic red-eye shows pupils as a glowing red color. For the red-eye form, in one embodiment, the formula is:

$$monochromevalue = red - \frac{green + blue}{2}.$$

Figure 6:
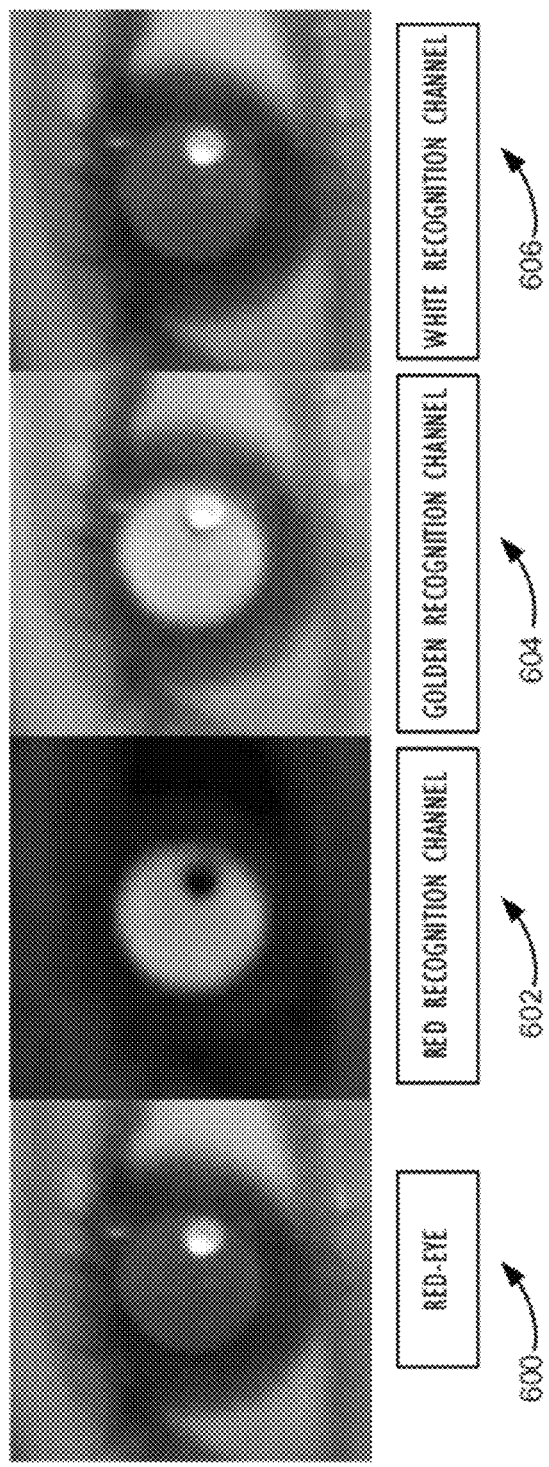
FIG. 6 illustrates the red, golden, and white recognition channels corresponding to a red-eye artifact in an image, in accordance with one embodiment.

This formula is very good at catching red-eye, but secondary artifacts, such as specular shine (which is desirable to preserve) are not part of the prominence. Also, in red-white eye cases, the white part of the eye shine is not preserved, so it is desirable to use a different formula for that case. As shown in FIG. 6, element 600 shows the original red eye image, and element 602 depicts the red recognition channel. Notice that the areas of red eye are very bright (i.e., nearly white) in the red recognition channel image 602, whereas the specular shine shows up as very dark (i.e., nearly black) in the recognition channel image 602 due to the lack of red in the specular shine.

Golden

The golden forte of red-eye usually confounds most existing red-eye removal software. Here, golden-eye cases are defined to be red-eye cases that contain red, orange, yellow, and white. For the golden-eye form, in one embodiment, the formula is:

$$monochromevalue=red.$$

This formula is very good at catching golden-eye, since red, orange, yellow, and white all have a high red component value. As shown in FIG. 6, element 604 depicts the golden recognition channel.

White

A white-eye is defined to be a golden-eye where the specular shine is not recoverable. In this case, luminance is used as the recognition channel formula, since it produces a higher contrast with its surroundings than does pure red:

$$monochromevalue=0.299*red+0.587*green+0.114*blue.$$

In other embodiments, different constants may be used in calculating the monochrome value for the white recognition channel. As shown in FIG. 6, element 606 depicts the white recognition channel.

Size-Independent Snap-To Method

Figure 7A:
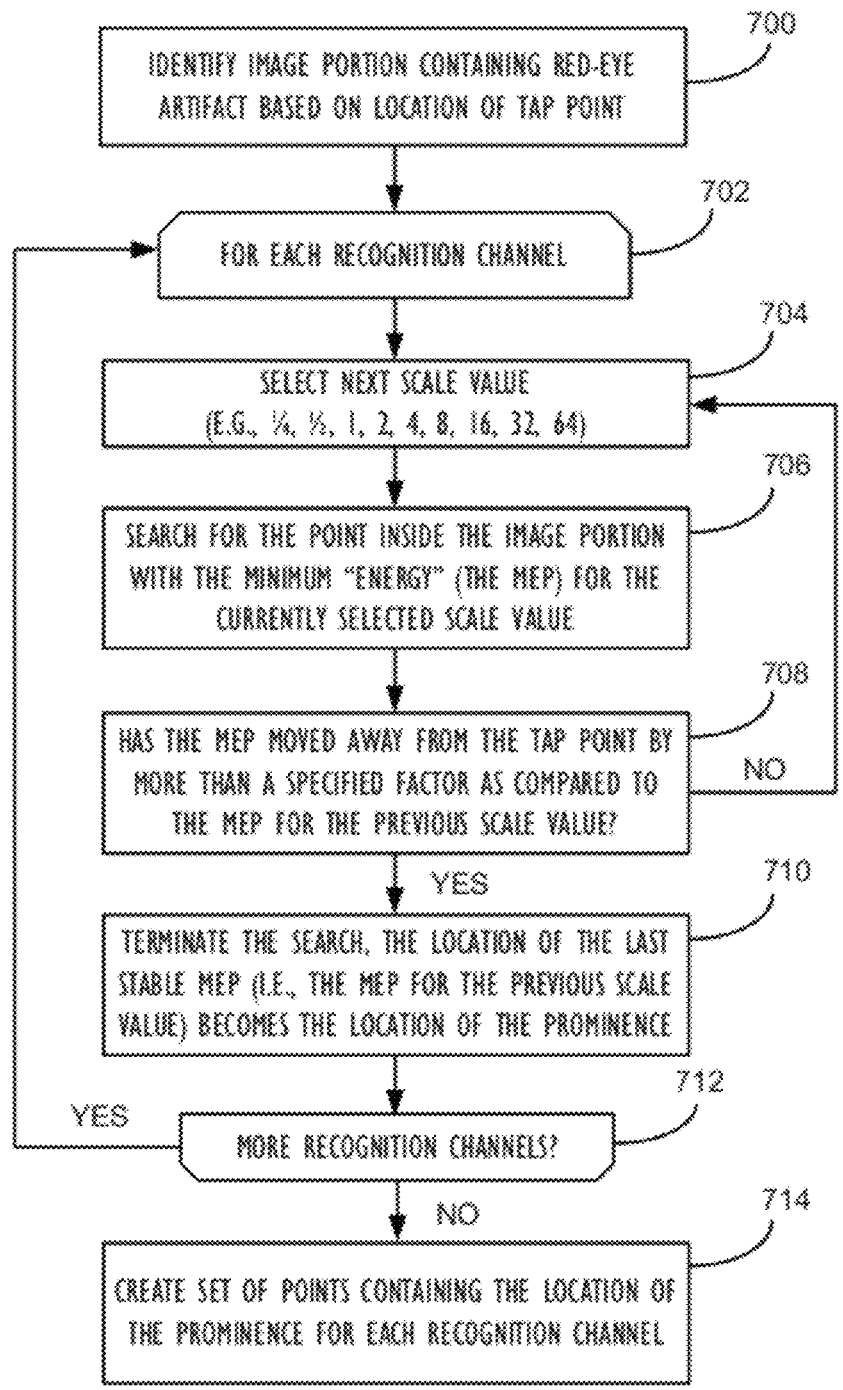
FIG. 7A illustrates a process for determining a prominence location, in accordance with one embodiment.

To determine the location and size of the prominence, one embodiment of a process for artifact removal operates in a manner that adaptively adjusts to size. Because features such as the corneal reflection (specular shine) and the sclera (whites of the eye) often stand out as prominent, to maximize the chance that the correct prominence is located, location hints may be used, e.g., the location of a user tap near the red-eye artifact or the eye point returned by a facial detection algorithm. The general steps involved in one embodiment of prominence location determination are shown in FIG. 7A.

When the user taps on the image, a portion of the image coincident with and circumscribing the tap location is extracted, e.g., an 80 pixel by 80 pixel rectangle, and used to produce, for example, three recognition channels for that section of the image (Step 700). Alternatively, in automatic red-eye repair processing, the image portion likely to contain the red-eye artifact must be determined in some other way without the aid of user input, e.g., via face detection algorithms that provide eye points, mouth points and/or other face location information. A significant problem with finding the prominence (in any of the recognition channels) is that, because the pupil can be any size, the extracted image portion should be made large enough to accommodate it. If the process merely located the brightest pixel in this area, it could easily be confused by such features as the sclera, reflections off glasses, or even red eyeglasses. So, the process may also incorporate the concept of nearness to the tap point (or located eye point in the case of automatic repair) in the search.

To do this, the process may start small and iteratively go larger and larger. Thus, in one embodiment, the concept of an "energy" function is employed. The process may then attempt to locate the point with minimum energy. In this case, the energy function may be:

$$energy = \frac{distance(pt, tapPoint)^2}{scale} - (monochrome\ value),$$

where distance may be calculated as a Euclidian distance (measured in pixels) between the point being evaluated and the tap point (or located eye point in the case of automatic repair).

Note that the nearness portion (i.e., the distance squared over the scale) of the exemplary energy function shown above is a quadratic function with a minimum value at the tap point (or located eye point in the case of automatic repair). The prominence portion, on the other hand, can be viewed as a function (i.e., the monochrome value of the recognition channel) that peaks at the brightest point of the prominence. Since the nearness portion comes to a minimum at the tap point, but rises farther away from the tap point, this means that the brightest prominences will be most noticeable at or near the tap point. Between two equal brightness prominences, the prominence at a larger distance from the tap point will produce a higher energy (less desirable, since energy is being minimized) value than the prominence closer to the tap point because of the nearness portion of the energy function. In this way, the nearness portion of the exemplary energy function works against spotting prominences far from the tap point, and increases the likelihood of spotting prominences closer to the tap point. Thus, for each recognition channel (Step 702), to make the method size-independent, the process may step through various scale values. In one embodiment, the sequence of scale values may be: ¼, ½, 1, 2, 4, 8, 16, 32, and 64 (Step 704). While doing this, for each scale, the point inside the image portion with the minimum energy value (i.e., the "minimum energy point" or "MEP") may be located (Step 706). The MEP comprises a site in each recognition channel of the image that is associated with a prominent value. There may be a separate MEP for each recognition channel. In practice, the MEP is stable across many values of scale. However, when the nearness portion of the energy function becomes widespread enough, it has been observed that the MEP often strays away from the prominence.

Taking advantage of this observation, the search may be terminated (Step 710) when the MEP moves away from the tap point by more than a specific factor, e.g., four, when compared to the previous MEP (Step 708). The last stable minimum energy point becomes the location of the prominence. Pseudocode for one embodiment of this search is given here:

```
for (index = -2; index < 7; index++)
{
    if (index < 0)
        scale = 1.0 / (1 << (-index)); //shift bits
    else
        scale = 1 << index; //shift bits
    minEnergy = infinity;
    for (all points pt in the image portion)
    {
        df = distance(pt, tapPoint)^2;
        brightness = monochromevalue(pt);
        energy = df/scale - brightness;
        if (energy < minimumenergy)
        {
            minimumenergy = energy;
            MEP = pt;
        }
    }
    if (index > 0)
        if (distance(prevMEP, tapPoint) > 4 * distance(MEP, tapPoint))
            break;
    prevMEP = MEP;
}
return prevMEP;
```

This search may then be repeated for each of the recognition channels (Step 712). This produces a set of points, each identifying the prominence in a recognition channel (Step 714). Scale-independence may also be improved when searching for the prominence by using a morphological maximum operation, as will be described in greater detail later, and comparing actual recognition signal values to this max value. The result of the process described in relation to FIG. 7A is the identification of a set of points that are likely to represent the actual location of the prominence and not merely a very bright pixel in the portion of the image being analyzed that is actually a sclera pixel, a pixel representative of a reflection, or any other pixel that is bright for some reason other than being part of a red-eye artifact.

Determining Prominence Bitmasks

Figure 7B:
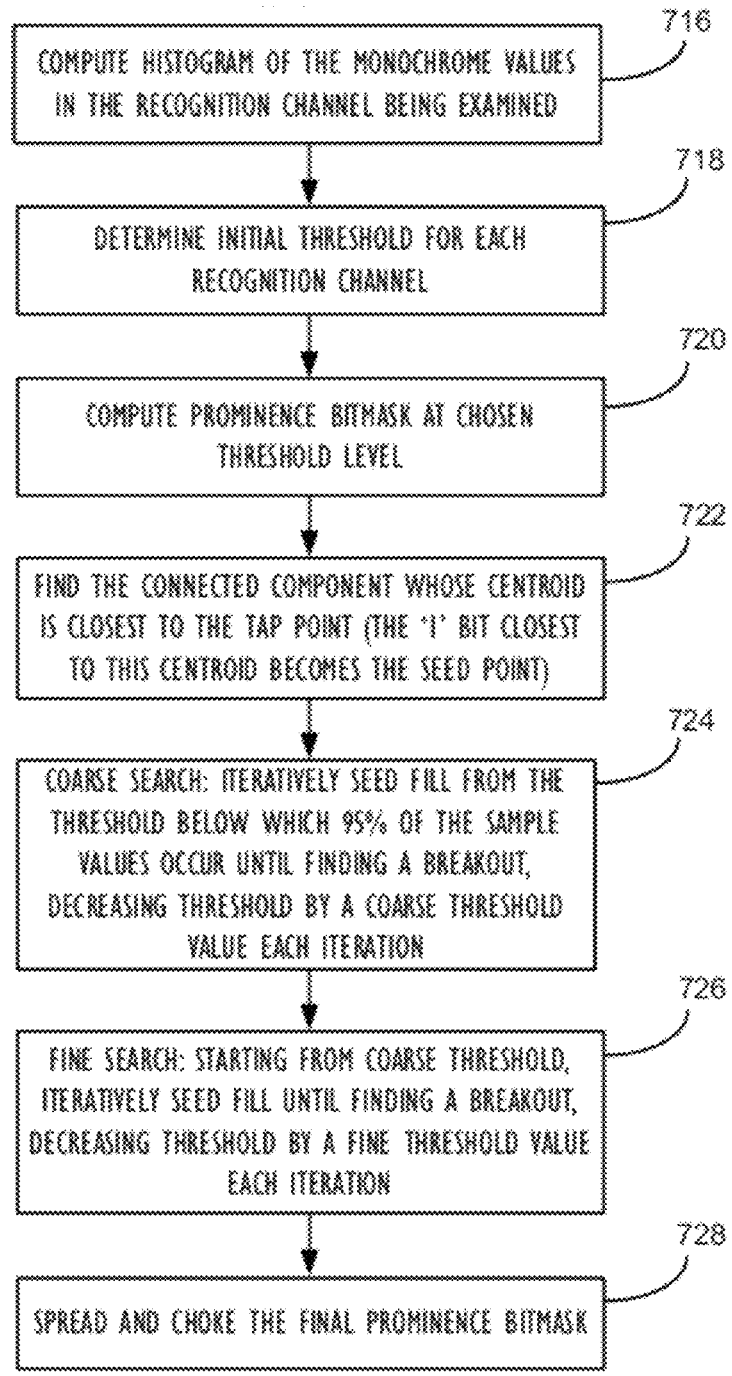
FIG. 7B illustrates a process for determining a prominence bitmask, in accordance with one embodiment.

As a rough technique for isolating the size of the prominence, a prominence bitmask may be computed. This bitmask is a set of 1's and 0's, with a 1 indicating a pixel inside the prominence, and a 0 indicating a point outside the prominence. So far, all that is known is a tap point (or located eye point in the case of automatic repair) that reliably points to a location in the prominence, but it is not yet known how large the prominence is. To solve this problem, a seed-fill based approach may be used to capture the full extent of the prominence. The details of one embodiment of this approach are shown in FIG. 7B and enumerated here:

1.) Compute the histogram of the monochrome values in the recognition channel being examined (Step 716). In some embodiments, the monochrome value levels below which 5%, 50%, and 95% of the sample values in the histogram occur may also be calculated at this point.

2) Using a morphological maximum operator with a, for example, rectangular window, compute the maximum for the recognition channel. The window size may be a constant, such as 11×11, for example, or, if an interocular distance (IOD) is known, the window size may be computed based on a function of the IOD. As used herein, a morphological maximum operator examines a window around a center pixel to determine the brightest pixel in the window and then sets the value of the center pixel to be equal to the brightest pixel's value. This morphological maximum operator has the effect of ensuring local maxima are at least a certain number of pixels apart from each other, determined by the window size. When the maximum morphology value for a given pixel is the same as the original recognition channel value, that pixel is a local maximum in the recognition channel. The signal value at that pixel is then, by definition, inside the prominence. Thus, it has been determined that the threshold for seed filling is below this pixel's value. It has also been determined that this pixel will be a good starting point for the seed fill operation. Using the morphological maximum operator, one may find the peak nearest to the tap point and the associated local maximum recognition channel value. If that local maximum is less than the 95% threshold level, then that level may be set to the local maximum. The 50% level may be adjusted as well, if it is below the local maximum. In this case, the 50% level may be set to the local maximum minus 1. Next, an initial threshold level that is ⅓ of the way from the 50% level to the 95% level may be chosen, as it is a heuristic that seems to produce better results in the seed fill (Step 718). If the threshold value winds up being equal to the local maximum, the level is decremented. This technique can also improve scale-independence. In other embodiments, different empirical techniques may be used to calculate the initial threshold level.

3.) Compute a bitmask that contains 1's for all pixels above the threshold and 0's for all pixels at or below it. It is also desirable, for some applications, to omit the 1 pixels that occur on the edge of the search region. The resultant bitmask can contain many contiguous 1-bit areas (each such area may be referred to as a "connected component" of the threshold bitmask) (Step 720).

4.) Find the connected component whose centroid is as close as possible to the tap point. The 1 bit that is closest to this centroid becomes the seed point, i.e., a possible prominence center (Step 722). Seed filling a recognition channel for red-eye can be complicated by the presence of specular shine, which has a very low value in the recognition channel for red-eye. In such instances, the red-eye recognition channel can actually have an annular shape, meaning that the centroid is actually not in the prominence, thus complicating the desire to get the centroid point.

In an automatic red-eye repair operation, since an interocular distance (IOD) is known, it becomes possible to predict a range of allowable sizes for the pupil artifact. In this case, maxsample can be extracted (the value of the recognition channel at the prominence). The maxsample value may be used as an initial threshold in the threshold search. A lowerRepairSize and an upperRepairSize may be determined from the IOD. (See discussion below, which replaces steps 724 and 726 in FIG. 7B for the automatic red-eye repair case when IOD is known.) Using these values, corresponding area ranges can be computed.

lowArea=(PI/4)*lowerRepairSize*lowerRepairSize;

highArea=(PI/4)*upperRepairSize*upperRepairSize;

This area range can be widened so that more cases may be caught, e.g.:

lowArea*=0.6;

highArea*=1.25;

A coarse search may start the process, during which the threshold may be varied from maxsample down to and including 0 in big steps (e.g., bigstep=8). At each threshold examined, a seed fill can be done starting at the prominence point, and a bitmask produced with 1 bits for each corresponding recognition channel pixel that has a value greater than the threshold, and which is contiguous and reachable from the prominence point. This iteration may be terminated when the bitmask area is greater than or equal to the lowArea.

```
bigstep = 8;
for (threshold = maxsample; threshold >= 0; threshold -= bigstep)
{
    bm = seedFill(prominencePoint, recognitionChannel, threshold);
    area = bitmaskArea(bm);
    if (area >= lowArea)
        break;
}
```

At this point, if the threshold is less than zero, no bitmask can be computed, and the bitmask computation fails. However, if the threshold is not less than zero, then highThreshold may be computed as:

highThreshold=threshold+bigstep;

A second coarse search may now be performed to find the low end of the threshold range. The threshold can once again be varied from its current value down to and including zero in big steps. At each threshold, a seed fill may be performed starting at the prominence point, and a bitmask produced with 1 bits for each corresponding recognition channel pixel that has a value greater than the threshold, and which is contiguous and reachable from the prominence point. This iteration can be terminated when the bitmask area if greater than highArea.

```
bigstep = 8;
for (threshold = highThreshold; threshold >= 0; threshold -= bigstep)
{
    bm = seedFill(prominencePoint, recognitionChannel, threshold);
    area = bitmaskArea(bm);
    if (area > highArea)
        break;
}
```

The lowThreshold may now be computed from the current value of the threshold:

lowThreshold=threshold;

A finer search may now be done where the threshold varies from highThreshold down to lowThreshold inclusive in small steps (e.g., step=1). At each threshold, a seed fill may be performed starting at the prominence point, and a bitmask produced with 1 bits for each corresponding recognition channel pixel that has a value greater than the threshold, and which is contiguous and reachable from the prominence point. Within this iteration, only bitmask results that are within the prescribed area range are of interest. The ovalness may be measured (described below), along with the contrast and the mincontrast (described below). A score may be determined which is some function of these values (an example function is shown below). The threshold may be computed whose score is maximal, and assigned to maxThreshold.

```
step = 1;
maxThreshold = -1;
maxScore = 100.0;
for (threshold = highThreshold; threshold >= lowThreshold;
threshold -= step)
{
    bm = seedFill(prominencePoint, recognitionChannel, threshold);
    area = bitmaskArea(bm);
    if (area > highArea || area < lowArea)
        continue;
    ovalness = bitmaskOvalness(bm);
    contrast = bitmaskContrast(bm);
    mincontrast = bitmaskMinContrast(bm);
    score = ovalness + (contrast + mincontrast) / 255.0;
    if (score > maxscore)
    {
        maxScore = score;
        maxThreshold = threshold;
    }
}
```

If maxThreshold is −1, the bitmask can not be computed and the bitmask computation fails. If maxThreshold is not −1, the bitmask corresponding the final maxThreshold may be computed and parameters for this bitmask may be retained.

In manual red-eye repair, no IOD is known and thus the techniques described directly above may not be used. An alternate technique may be used for the manual red-eye repair case and also for the case of growing a bitmask corresponding to the area of a specular shine. The discussion in steps 5.) and 6.) below detail this technique.

Figure 8:
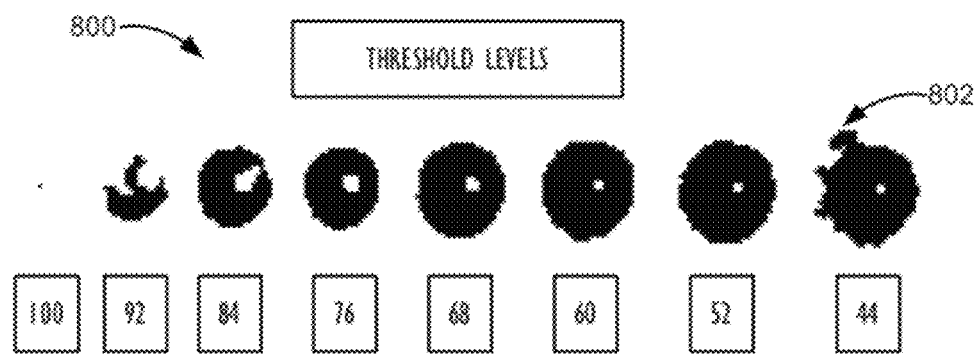
FIG. 8 illustrates prominence bitmasks at various threshold levels, in accordance with one embodiment.

5.) Coarse threshold level search. First, the process may iteratively seed fill from an initial threshold below which 95% of the sample values occur downwards. As the threshold is lowered, the bitmask tends to include more and more pixels of the prominence. In the coarse search, the threshold may be decremented by a coarse threshold value, e.g., eight, each time in the iteration. This limits the total number of seed fills required. The coarse search lowers the threshold until either the 5% level is reached or a "breakout" occurs, thus halting the act of seed filling at the current threshold level (Step 724). FIG. 8 shows an example of various prominence bitmasks 800 resulting from coarse threshold levels ranging from 100 down to 44. Notice that breakout 802 occurs when the threshold is lowered to 44. This indicates that pixels outside the actual prominence are likely incorrectly being added to the prominence bitmask.

6.) Fine threshold level search. This can be similar to the coarse search, except that it decrements the threshold by a fine threshold value, e.g., one, each time to sharpen the result. Fine search tends to concentrate on the threshold levels that are nearest to the threshold that has the best breakout measure, i.e., the most accurate threshold to use in constructing the bitmask (Step 726).

7.) Spread and choke the final prominence bitmask to eliminate 1-pixel holes and smooth the result (Step 728). Spreading a bitmask comprises setting any '0' pixel with a '1' pixel neighbor to be '1'. Choking a bitmask comprises setting any '1' pixel with a '0' pixel neighbor to be '0'.

Turning

Figure 9A:
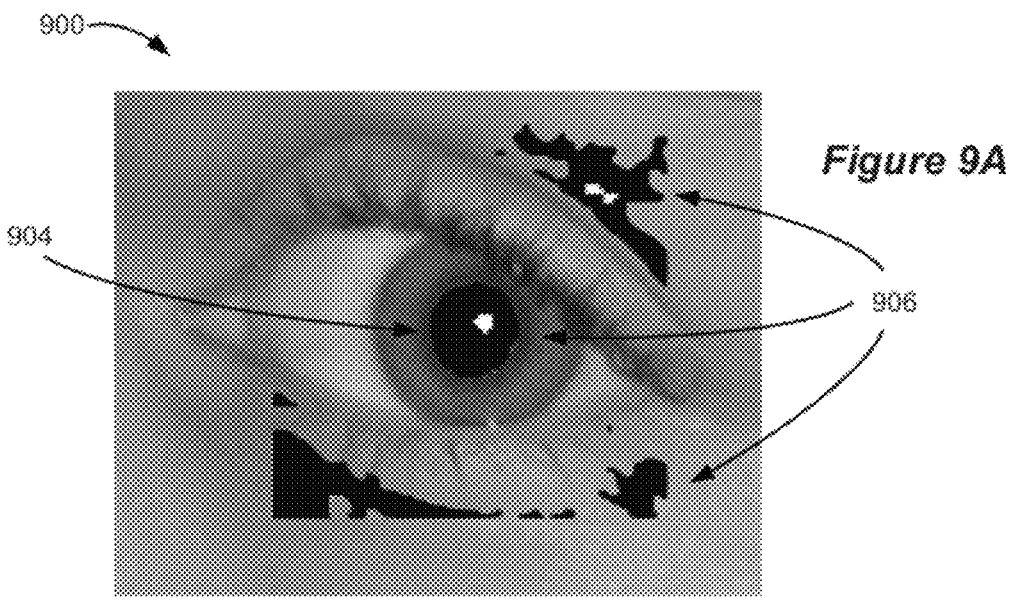
FIG. 9A illustrates the connected components of a prominence bitmask overlaying the underlying image, in accordance with one embodiment.
Figure 9B:
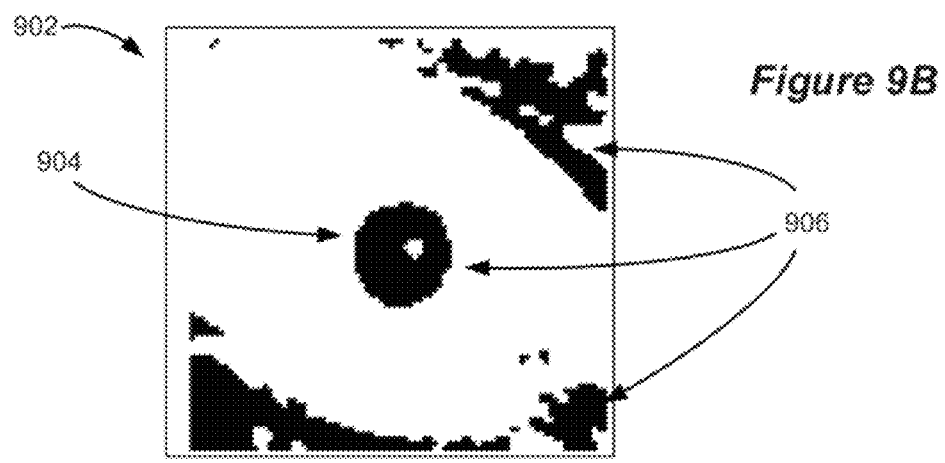
FIG. 9B illustrates the connected components of a prominence bitmask without the underlying image underneath, in accordance with one embodiment.

Turning now to FIG. 9A, a prominence bitmask 906 is shown overlaying the image of the red-eye 900. The various black regions 906 represent the various connected components of the bitmask. As can be seen, element 901 is the closest connected component to the pupil, and thus more likely to be the actual red-eye prominence, as will be discussed further below. Image 902 of FIG. 9B shows the same prominence bitmask 906 with the underlying image removed for clarity.

Prominence Bitmask Metrics

After seed fill at each threshold, the prominence bitmask may be examined and several metrics can be evaluated on it. Some illustrative metrics are shown in Table 1 below:

TABLE 1

Illustrative Prominence Bitmask Metrics

| | |
|---|---|
| bounding rectangle | An integer rectangle tightly enclosing all 1-valued bits of the bitmask. This may be evaluated first and can be used to limit the scope of the other metrics' evaluations. |
| centroid point | The average of all the positions of the 1 bits in the bitmask. |
| area | A count of all the 1 bits in the bitmask. |
| ovalness | A measure of how close the bitmask is to being an oval. |
| contrast | A measure of the average contrast of the corresponding recognition channel over all the, for example, 4-connected, edge pixels of the bitmask. Contrast may be measured as the sum of absolute magnitude differences across the pixel in each of, for example, four different directions (0, 45, 90, and 135 degrees). |
| minimum contrast | The minimum contrast of the corresponding recognition channel over all the edge pixels of the bitmask. |

Figure 10:
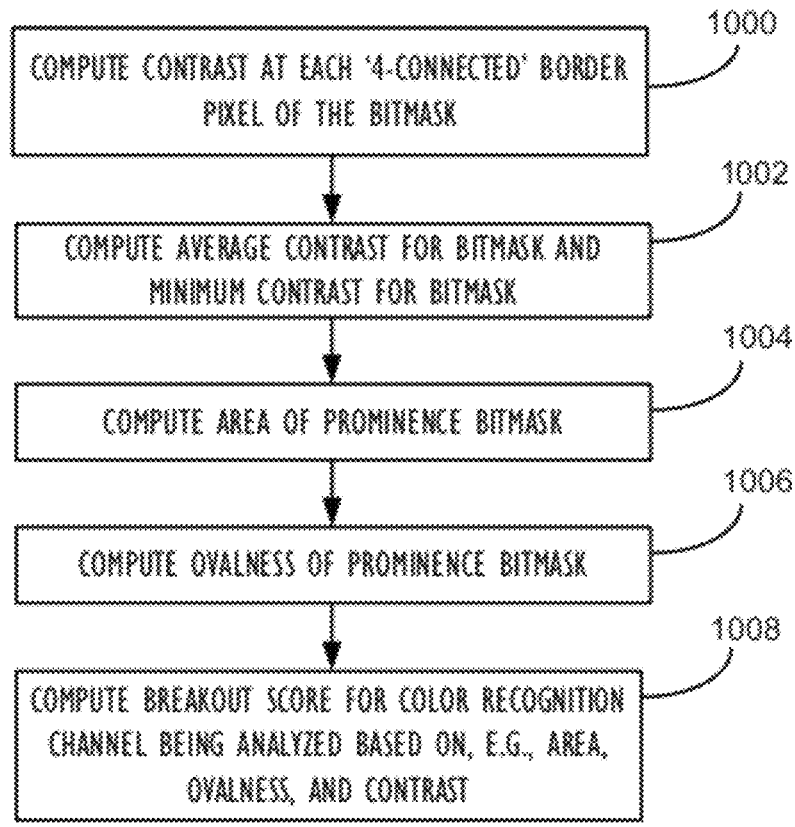
FIG. 10 illustrates a process for determining prominence bitmask metrics, in accordance with one embodiment.

One embodiment of a process for analyzing various prominence bitmask metrics is shown in FIG. 10.

Contrast and Minimum Contrast

Figure 11A:
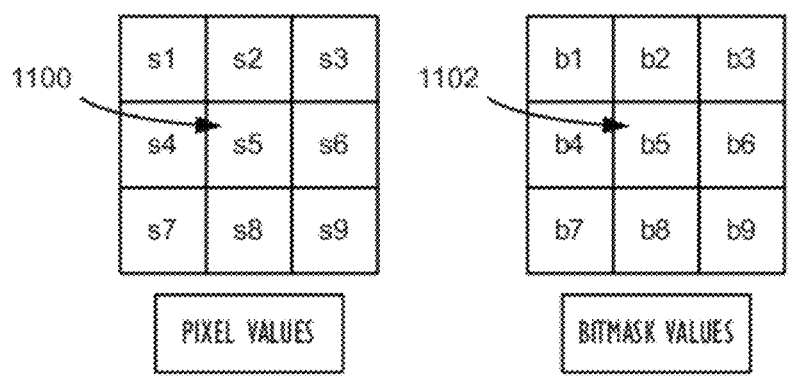
FIG. 11A illustrates a pixel and its surrounding pixels' values, as well as their corresponding bitmask values, in accordance with one embodiment.

The contrast can be measured at each 4-connected border pixel of the bitmask, and the contrast value itself may be measured in the corresponding pixel in the recognition channel (Step 1000). A neighborhood of eight pixels surrounding the pixel whose contrast is being measured (e.g., pixel s5, which is labeled element 1100 in FIG. 11A) may be considered. A 4-connected border pixel is defined to be a pixel, s5, where the corresponding bitmask value, b5 (labeled element 1102 in FIG. 11A) does not equal 0 and b2+b4+b6+b8<4. Note: $b_n$ is the bitmask bit value corresponding to pixel $s_n$. The contrast may then be computed at pixel s5, as follows: contrast=abs(s1−s9)+abs(s2−s8)+abs(s3−s7)+abs(s4−s6).

Using this approach, the contrast for a bitmask is the average of the contrasts over all the 4-connected border pixels of the bitmask. The minimum over all such contrasts can also recorded (Step 1002). In practice, it has been found that contrast reaches a steady maximum at the edge of the pupil, and minimum contrast falls at breakout.

Area

As mentioned above, the area of the prominence bitmask may also be used as part of a scoring metric (Step 1004).

Ovalness

To measure the ovalness of a bitmask, the bitmask's bounding rectangle may be determined first, and the bounding rectangle's inscribed oval. Next, the sum, s, of all misplaced pixels (i.e., 1's outside the oval and 0's inside the oval) may be determined. The ovalness may then be computed as follows:

$$\text{ovalness} = 1 - \frac{2 \times s}{\text{area}(boundingRectangle)} \text{(Step 1006).}$$

Note: the factor of 2 in the formula tends to accentuate differences in ovalness, particularly when ovalness is much less than 1. In practice, the pupil is not always oval. It may, for example, be clipped on top or on bottom by an eyelid. A specular shine can occur within the pupil or on its boundary. So the ovalness is only a part of the scoring formula.

Breakout

When growing the prominence bitmask, the changes in the metrics from threshold to threshold can be examined and a breakout score determined. Breakout, as used herein, occurs when this score exceeds a predetermined threshold, or when a bump in the scores happens that exceeds some threshold multiplied by the scores calculated at previous threshold levels, but not before a certain number of thresholds have been considered. As a final breakout rule, when the bitmask bounding rectangles begin to intersect the edges of the allocated bitmask area itself, breakout can be forced. Breakout may be used with the red-eye and golden-eye cases.

White-Eye Metrics

When trying to characterize the white-eye case, a different metric may be used, i.e., a measure of "goodness." In one embodiment, this measure is: measure=ovalness*(min(contrast, 100)+mincontrast); if (area==1) then measure=0. This illustrative measure has the advantage of being more likely to be able to characterize a specular shine.

Scoring

In the C programming language, the → operator is like a field reference. The variables "cur" and "last" used herein are then pointers to metric information for the current and last thresholds. So, for example, references like cur→area represent the area metric measured from the seed fill bitmask produced at the current threshold. Scoring examines the metrics of a prominence bitmask at the current threshold, "cur,"

and compares them with the metrics of the prominence bitmask at the last threshold, "last." A score may be produced using the area, ovalness, and contrast metrics (Step 1008). In one embodiment, scoring is only used in the red-eye and golden-eye cases.

Figure 12A:
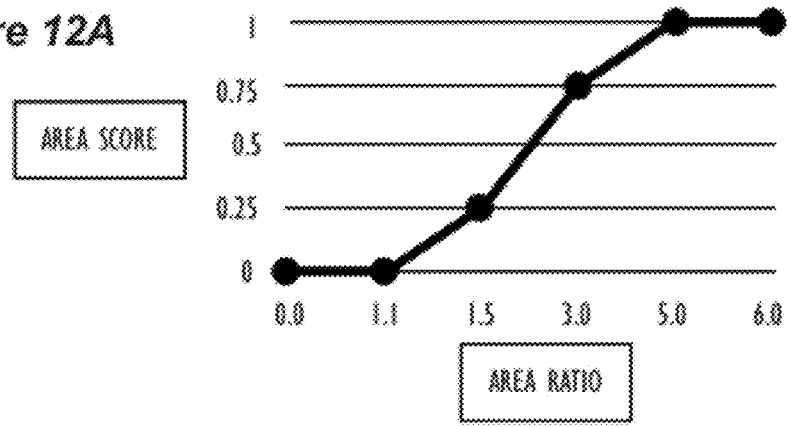
FIGS. 12A-12C illustrate various prominence scoring mapping functions, in accordance with one embodiment.

The first score component is the areaScore. To begin, the areaRatio and then an areaScore (determined from the areaRatio), using the function shown in FIG. 12A may be used, where $$areaRatio = \frac{cur \rightarrow area}{\max(1, last \rightarrow area)}.$$

Figure 12B:
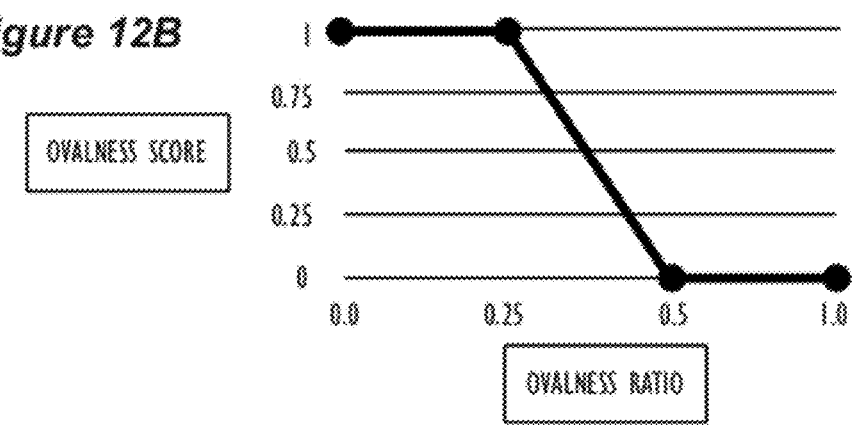

The second score component can be an ovalnessScore. As before, the ovalnessRatio may be determined and then an ovalnessScore (determined from the ovalnessRatio), using the function shown in FIG. 12B, where ovalnessRatio may be determined as shown here:

```
if (last->ovalness < 0.3 && cur->ovalness < 0.3)
    ovalnessRatio = 0.0;
else
    ovalnessRatio = cur->ovalness / max(0.01, last->ovalness);
```

The third and final score component can be a contrastScore. Initially, the contrastRatio may be computed as follows:

$$contrastRatio = \frac{cur \rightarrow contrast + cur \rightarrow minContrast}{\max(0.01, last \rightarrow contrast, last \rightarrow minContrast)}.$$

Figure 12C:
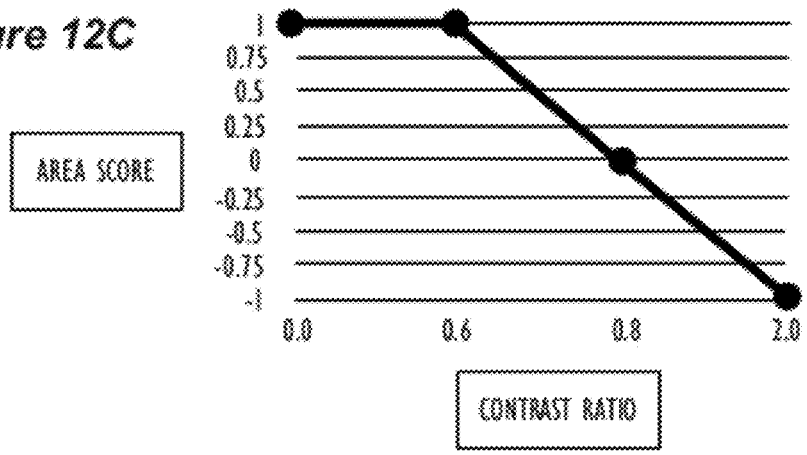

A contrastScore may then be determined from the contrastRatio, using the function, for example, shown in FIG. 12C. In each of FIGS. 12A-12C, the ratio is along the horizontal axis and the resultant score is along the vertical axis.

The final score may be determined using the three score components described above as follows:

```
if (last->area <= 5)
    score = 0.0;
else
    score = max(0.0, areaScore + ovalnessScore + contrastScore;)
```

II. Discernment

In the embodiments described herein, the primary data used for discernment are the red, golden, and white prominence bitmasks. The topological configuration and relative positions of these three bitmasks and their metrics can provide a great deal of information about which case to choose with manual red-eye repair processes. As will be explained below in Section IV, entitled, "Automatic Red-Eye Repair Techniques," with some automatic red-eye repair processes, the discernment techniques described here in Section II need not necessarily be performed.

Topological Configuration

The overlapping arrangement of the three prominence bitmasks can provide a good deal of information about the case: whether it is a red-eye, golden-eye, or white-eye case. The prominence bitmasks may be placed into register with each other, and theft overlap examined directly using bitwise intersection operations.

One reason it can be advantageous to determine the which case to use is that each has its own issues when performing the cancellation step, i.e., the step in which the identified artifact is removed and repaired so that the eye may be re-rendered. The topological configuration, relative positions, and metrics of the red, golden, and white prominence bitmasks are the main indicators of which case to choose when performing cancellation. Each case has its own method of cancellation, so the type of case should be discerned so that the most effective techniques to fix the case may be employed.

Handling Different Cases

As can be expected, some prominence topological configuration cases are more common than others. In general, red-eye itself is more common than golden-eye and white-eye. The primary driver for the case being a red-eye case (as opposed to a golden-eye or a white-eye case) is that the contrast for the red prominence bitmask exceeds a predetermined threshold. But, sometimes, when a red-white case occurs, this is not enough. In practice, it has been found that it is useful to combine this test with an ovalness test in order to capture the vast majority of red-eye cases.

The first task of discernment is to gather the statistics on the three prominence bitmasks and also on the combinations formed by their overlap. These statistics may include the ovalness, area, and contrast of each bitmask, as well as the area of intersection and union between each of the red, golden, and white prominence bitmasks.

The next task of discernment is to recognize the primary red-eye case. The primary test for a red-eye case can start with evaluating the ovalness of all three recognition channel case prominence bitmasks. If the red prominence bitmap has a contrast greater than 90, or if its contrast is greater than 30 and its ovalness is also greater than 55 percent of the maximum ovalness of all three prominence bitmasks, then the case may be designated primary red-eye. But even in this case, it's possible that golden-eye is occurring. In particular, when the white and golden prominence bitmasks are substantially overlapping and substantially the same in area, and when they are greater in area than some majority, e.g., sixty percent, of the red prominence bitmap area, it is studied further. In accordance with one embodiment, two bitmasks are deemed to "substantially overlapping" and "substantially the same in area" if the area of the intersection of the two bitmasks is between 80 percent and 125 percent of the area of the union of the two bitmasks. In this possibly-golden case, if the red contrast is greater than 100 and the overlap between the white and golden prominence bitmasks is greater than 10 times the red prominence bitmap area, then the case may be judged to be the interior of eyeglasses, and hence the case may be judged to be red-eye. Also, if there is little overlap between the red and golden prominence bitmasks, then it may be judged to be a sclera, so again the case may be determined to be a red-eye case. Otherwise, the possibly-golden case is judged to be golden. If the primary red-eye case is not golden, then it is red-eye. In one embodiment, pseudocode for the above discernment steps may be represented as follows:

```
//r = red, g = gold, w = white
//rp = red prominence, gp = gold prominence, wp = white prominence
//om = ovalness max
or = ovalness(rp); og = ovalness(gp); ow = ovalness(wp);
ar = area (rp); ag = area (gp); aw = area (wp);
cr = contrast(rp); cg = contrast(gp); cw = contrast(wp);
om = max(or, og, ow);
a1 = area(intersect(gp, wp)); a2 = area(union(gp, wp));
a3 = area(intersect(rp, union(gp, wp)));
a4 = area(intersect(rp, wp)); a5 = area(union(rp, wp));
a6 = area(intersect(rp, gp));
GR = boundingRectangle(gp);
```

```
if (cr > 90.0 || (or >= om/2 && cr > 30.0))
{
    if (comparable(a1, a2) && a1 > ar*6/10)
    {
        if (cr > 100 && a1 > ar*10)
            theCase = eyeRed;
        else if (a6 < ar/2)
            theCase = eyeRed;
        else
            theCase = eyeGolden;
    }
    else
        theCase = eyeRed;
}
```

Next, if discernment fans to identify the current case as a primary red-eye case, then other possible remaining cases may be examined. If the white and golden prominence bitmasks are comparable in area and the red prominence bitmask is small in comparison, then the case may be deemed to be a golden case. Otherwise if the red prominence bitmask is substantially covered by the white and golden prominence bitmasks, i.e., covered by some majority, e.g., sixty percent, then the case may be deemed a golden case. Otherwise, if the red prominence bitmask contains most of both the golden and white bitmasks, and the union of golden and white contains a large percentage of the red bitmask, then the case may be deemed a golden case. Otherwise the case is identified as unknown at the current time. In one embodiment, pseudocode for the above discernment steps may be represented as follows:

```
if (comparable(a1, a2))
{
    if (ar < a2/10)
        theCase = eyeGolden;
    else
    {
        if (comparable(a3, ar))
            theCase = eyeGolden;
        else if (comparable(a3, a2) && a2 > ar*6/10)
            theCase = eyeGolden;
        else
            theCase = -1;
    }
}
```

Next, if the union of the red and white prominence bit asks is "comparable" to the area of the golden bitmask then the case may be deemed a golden case. In accordance with one embodiment, two areas are deemed "comparable" if the second area is greater than 0 and if the first area is between 80 percent and 125 percent of the second area. In one embodiment, pseudocode for the above discernment steps may be represented as follows:

```
if (comparable(a5, ag))
    theCase = eyeGolden;
```

Next, if white is substantially inside of the golden bitmask, and golden is substantially inside of red, then the case may be deemed a golden case unless the overlap between red and white prominence bitmasks is small, in which case there is likely external specular shine, and so the case may be deemed a red-eye case. In one embodiment, the white prominence is considered to be substantially inside the golden prominence if the area of the intersection of the white prominence and the golden prominence (a1) is comparable to the area of the white prominence (aw). In a similar way, the golden prominence is considered to be substantially inside the red prominence if the area of the intersection of the golden prominence and the red prominence (a6) is comparable to the area of the golden prominence (ag). In one embodiment, the overlap between the red prominence and the white prominence is considered to be sufficiently small if the area of the intersection between the red and white prominences (a4) is less than ⅕ of the minimum of the areas of the red and white prominences (min(ar, aw)). Pseudocode for the above discernment steps may be represented as follows:

```
if (comparable(a1, aw) && comparable(a6, ag))
{
    a = min(ar, aw);
    if (a4 < a/5)
        theCase = eyeRed;
    else
        theCase = eyeGolden;
}
```

If the red prominence bitmask is mostly inside golden bitmask, then the case may be deemed a bright red eye case (possibly blurred if its contrast is low). Otherwise the case may be identified as still unknown. In one embodiment, pseudocode for the above discernment steps may be represented as follows:

```
if (comparable(a6, ar) && ar > 1 && ar*3 > ag)
    theCase = eyeRed;
else
    theCase = unknown;
```

The various ways of defining the thresholds for determining sufficient amounts of overlap and/or intersection between various bitmasks may be left to the individual implementation and fine-tuned for the type and size of camera being used to capture the photograph. For example, some cameras do not produce as much red-eye as others. And some cameras do not produce as many golden-eye cases. Some other cameras may produce more white-eye cases. This may mean that the various heuristics described herein may need to be adjusted to suit the particular camera being used.

If none of the tests has succeeded in determining what type of case is being dealt with, further examinations may be made into the relative placement of the prominence bitmasks. Pseudocode for further examinations according to one embodiment is shown as follows:

```
// cng = centroid of gold bitmask, cnr = centroid of red bitmask,
cnw = centroid of white bitmask
whiteRadius = radiusFromArea(aw);
goldenRadius = radiusFromArea(ag);
redDistance = distance(cng, cnr);
if (redDistance > goldenRadius && redDistance > whiteRadius)
    theCase = eyeGolden;
else if (inside(cnr, GR) && inside(cnw, GR) && ar*4 > ag)
    theCase = eyeGolden;
else if (ar > aw*3 && ar > ag*2)
    theCase = eyeRed;
else if (og > ow && ag > aw)
    theCase = eyeGolden;
else if (cr > 10 && distance(cnr, hit)*3 < distance(cnw, hit))
    theCase = eyeRed;
else if (touchingEdge(wp))
    theCase = eyeGolden;
```

```
    else
        theCase = eyeWhite;
```

In accordance with one embodiment, several functional operations may be specified here: the approximate radiusFromArea may be determined by taking the square root of the area divided by PI; the distance between two points may simply be the Cartesian distance between them; a point may be considered inside a bounding rectangle if its x coordinate is within the x bounds of the rectangle and its y coordinate is within the y bounds of the rectangle; and a prominence bitmask may be touchingEdge if breakout was determined because the prominence bitmask touched the edge of the area being searched.

Figure 13:
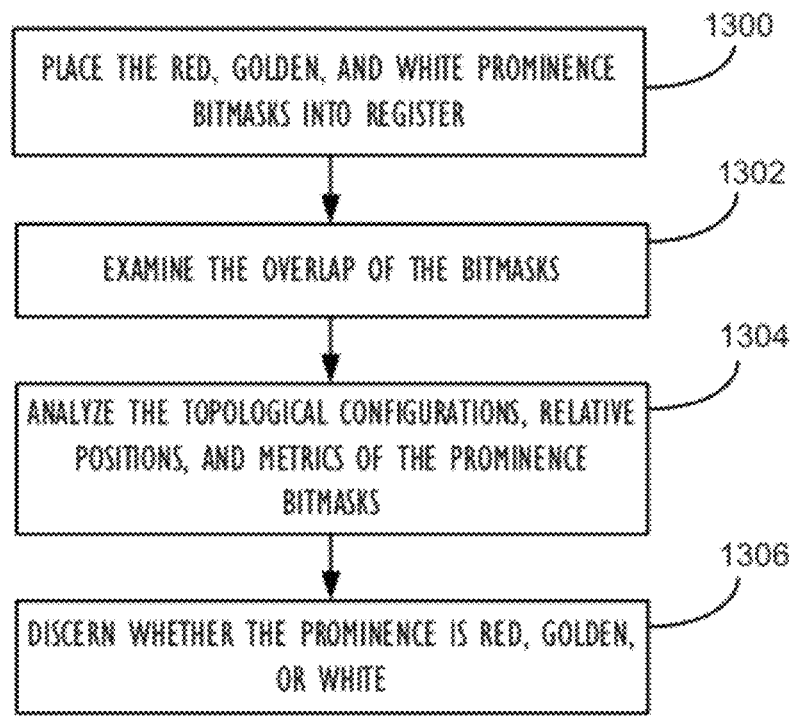
FIG. 13 illustrates a process for discerning what type of artifact a given prominence is, in accordance with one embodiment.

The process of discernment is summarized at a high level in the flowchart depicted in FIG. 13. In generalized terms, in one embodiment, the discernment process may first place the red, golden, and white prominence bitmasks into a memory register where they may be rapidly accessed (Step 1300). Next, the overlap of the various bitmasks, as was described above, may be examined (Step 1302). The topological configurations, relative positions, and metrics of the various prominence bitmasks, as was described above, may then be more thoroughly analyzed (Step 1304). Finally, a decision as to whether the case is a red-eye, golden-eye, white-eye, or some combination thereof may be made (Step 1306).

III. Repair

Repair is fixing or cancelling out the artifact in a way that is photographically reasonable. In some embodiments, repairing the artifact may comprise replacing at least a portion of the image's original color information with new color information, wherein at least some of the new color information is different from the original color information. Note that the red-eye, the golden-eye, and the white-eye cases may take different approaches to repair. The red-eye case can use a relatively simple approach to knock out the anomaly in the red channel while preserving the specular shine. The golden-eye case is similar, but usually requires more post-processing to recover a good specular shine. Typically, this can be achieved by using transfer functions, but more post-processing is sometimes needed. White-eye cases can be the most difficult since the specular shine may not be recovered in this case. In the white-eye case, the specular shine may be generated by the repair process. One method to do this is to get a valid specular shine from elsewhere in the image, since the character of the specular shine can vary immensely.

Figure 14:
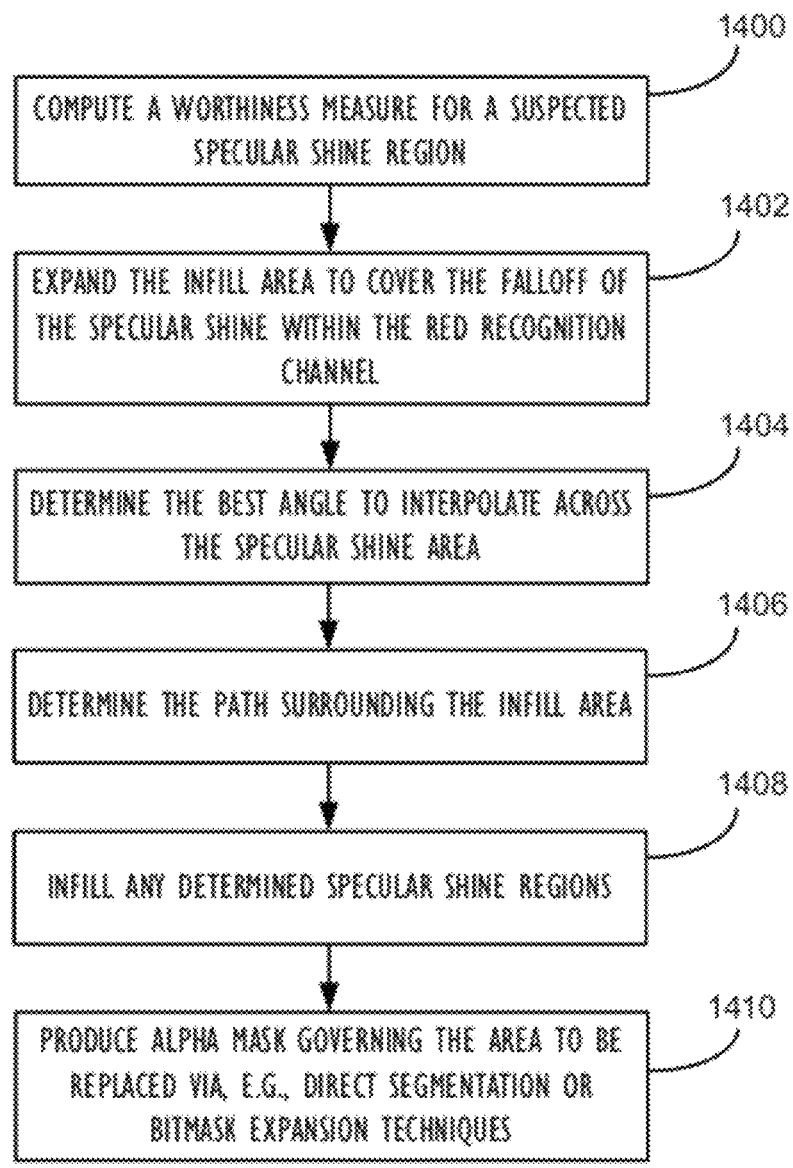
FIG. 14 illustrates a process for alpha mask production, in accordance with one embodiment.

The first task in repair is to produce an alpha mask that governs the area to be replaced. This process is generalized at a high level in FIG. 14. The use of a bitmask for this purpose may produce a jaggy result and is thus not photographically reasonable. Simple replacement of the artifact by pure black is generally not photographically reasonable either since relatively few images actually have a black level that's really zero. In the red case, to obtain a useful segmentation of the alpha mask, it may be helpful to first fill in the specular shine.

Infilling the Specular Shine

Before acquiring the alpha mask, in one embodiment, the specular shine may be in-filled in the red cases. This is because the red recognition channel shows a hole where the specular shine exists (see FIG. 6 at 602). The first stage of this process is to identify the specific area of the specular shine. To do this, the white recognition channel, which contains the luminance of the image neighborhood, may be examined. The same techniques may be used here to gather the area of the specular shine as were used to determine the prominence bitmasks, with a few modifications. The main difference occurs during the passes that expand the search area. Rather than using a breakout method and a scoring technique, a measure function may be used to determine the "worthiness" of a particular threshold level (Step 1400). Since specular shines generally are smaller than pupils, a worthiness measure may be used that is a combination of size probability, ovalness, and contrast. The size probability term may be defined as follows:

$$sizeProbability = \left(\min\left(\max\left(1 - \frac{2 \times cur \rightarrow area}{pupil\_Area}, 0\right), 1\right)\right)^2.$$

The full worthiness measure may be given by: measure=probability*cur→ovalness*(cur→contrast cur→min_contrast). This measure can be evaluated at every threshold during the coarse and fine threshold search passes.

The second stage is to expand the infill area to cover the falloff of the specular shine within the red recognition channel (Step 1402). Next, a new empty bitmask may be created to contain the result. This may be done by scanning the red recognition channel in the area of the specular shine (determined by the bitmask) and finding the location with the lowest value. If there are many samples with the lowest value, then the one with a location closest to the centroid of the bitmask may be chosen. This local minimum in the red recognition channel can become the center point for the expansion search.

The maximum distance, md, from the center to every set bit in the bitmask may then be determined. Next, the number of rays required to get a dense characterization of the expansion of the bitmask area may be evaluated, in the following way:

$n$Rays=round(4*PI*$md$).

This becomes the number of rays that are sent out from the center point, and it is based on placing at least two rays per pixel of the border of the bitmask. As each ray is sent out, the red recognition channel may be examined for a local maximum along the ray. Bits may then be set in the new bitmask along the ray from the center point to the position of the local maximum. When all rays are complete, there is a nearly fully dense representation of the expanded bitmask. Finally, the bitmask may be spread and choked to get rid of any 1-pixel holes, leaving only contiguous regions.

The third stage is infill. Initially, the angle to interpolate across the specular shine area may be determined (Step 1104). Generally, it is desirable to interpolate along the approximate direction of the pupil's edge at the infill area—unless the infill area is entirely inside the pupil. If the image was sharpened, the infill can cause ringing edges generated during the sharpening process to become full-fledged internal edges of the pupil, confusing the alpha extraction process. Unwanted edges may be mitigated by performing correlations across the infill area to determine the best interpolation. Pseudocode for performing the infill process, according to one embodiment is given below:

```
compute the bounding rectangle of the infill area;
determine a path p that tightly surrounds the infill area;
set minsum to infinity;
for (angle = 0, 10, 20,., 170 degrees)
{
    let f1 be a function; −x*sin(angle) + y*cos(angle) and f2 =
        x*cos(angle) + y*sin(angle);
```

```
    determine the f1-monotonic arcs a of path p at this angle;
    determine the f1 range r over all pixels inside the infill area;
    compute sum, the correlation across the infill area
        using arcs a over f1 range r;
    if (sum < minsum)
        {
        minsum = sum;
        minangle = angle;
        mina = a;
        }
}
fill the infill area in the red recognition channel by interpolating across it
using arcs
    mina at angle minangle;
```

Determining the Path that Surrounds the Infill Area

To determine the path (Step 1106) that tightly surrounds the infill area, it may be assumed that the infill area has no holes. This is generally true based on the technique used in stage two. First, the process estimates the size of the path by counting the empty pixels that border the infill area. Path "choke points," i.e., pixels where either both their north and south neighbors are in the infill area, or both their east and west neighbors are in the infill area, may be counted twice. Next, the first (i.e., top-left) pixel of the border may be located and used as the starting point of the path.

The following convention may be used for directions in crawling the path: 0 means west, 1 means south, 2 means east, and 3 means north. At the start point, the direction is always 0 by definition. One embodiment of a method of tracing the outside path is shown in the following pseudocode:

```
while (1)
{
    add the current point to the end of the path;
    move forwards in the current direction;
    if (path now once again at the start point)
        break;
    if (when path turns right here, it arrives at a border pixel)
        turn right and continue;
    if (when path goes straight here, it arrives at a border pixel)
        go straight and continue;
    if (when path turn left here, it arrives at a border pixel)
        turn left and continue;
    back up one pixel;
}
```

Because of the convention for the directions, and because there are 4 directions, the path can turn right by using direction=(direction+1) & 3, the path can go straight by leaving direction alone, the path can turn left by using direction=(direction−1) & 3, and the path can back up by using direction=(direction+2) & 3. As used herein, the '& 3' operation means using a bitwise AND with 3. This effects a mod-4 operation using integers because of the binary representation of the integers. The answer of such an operation is always 0, 1, 2, or 3, and represents the residue of the value to the left taken modulus 4. So, if direction is 2, then (direction−1) & 3 is 1 & 3, which is then 1. Note that, if direction is 0, then (direction−1) & 3 is 3. This allows the direction calculation to wrap back around, effectively, reducing it back down to the range 0 . . . 3. Thus, the path can advance from point (col, row) to the next point at a given direction by using the following pseudocode:

```
switch (direction)
{
    case 0: col++; break;
    case 1: row++; break;
    case 2: col−−; break;
    case 3: row−−; break;
}
```

About the f1 and f2 Functions

The f1 function mentioned in the infill pseudocode above remains constant along lines at the current angle, but varies perpendicular to those lines. The f2 function is perpendicular to f1, and allows the evaluation of an ordering along the lines of constant f1.

Determining f1-Monotonic Arcs of the Path at an Angle

Once the path that tightly surrounds the infill area has been evaluated, one embodiment may next break the path into f1-monotonic arcs. This methodology is similar that used for cross-hatching an area using lines that are specifically angled. Since the path is a closed loop, at any point in the path three f1 values may be determined: previous f1, current f1, and next f1. This allows the computation of two deltas: current f1 minus previous f1, and next f1 minus current f1. If these two deltas differ in sign, then the current point is the beginning of one arc and the ending of another. This is made slightly more complicated by zero deltas. In general, a zero delta means that the segment between two path points is aligned to the current angle, and so it may be omitted from the arcs. Also, a zero delta will terminate a list of all positive deltas or all negative deltas.

A single pass may be made to evaluate the number of arcs and the cumulative number of points in the bodies of all arcs. Arcs and space for the bodies of all arcs may then be allocated. A second pass may then be made to fill in the arcs and storing theft bodies. Each element in an arc body corresponds to a pixel along the path. The following information may be stored for each element:

```
float f1;
float f2;
int pix;
```

The f1 and f2 fields represent the f1 and f2 values at that pixel location in the path. The pix field stores the value of the red recognition channel at the pixel location in the path. For compactness and simplicity, all arc bodies may be stored in a single array. Each arc can then store an arc body start index into this array, and also an element count. Finally, the arcs may be marked as plus or minus. A plus arc is one where the f1 deltas are all positive, and it gets marked "plus." A minus arc is one where all the f1 deltas are all negative. Minus arcs' bodies also get reversed so that theft deltas become positive, and the arc record gets marked as "minus."

Determining the f1 Range Over all Pixels of the Infill Area

The range of f1 over the entire infill area may now be determined to make correlations easier to evaluate. These values may be stored in fmin and fmax. The pseudocode to evaluate these is:

```
fmin = infinity;
fmax = −infinity;
for (all pixels p in the infill area)
{
    evaluate f1 at pixel p;
    if (f1 < fmin)
```

```
        fmin = f1;
    if (f1 > fmax)
        fmax = f1;
}
```

All pixels of the infill area may be visited by enumerating all 1 bits in the infill area bitmask and considering only those pixels having a 1 bit in the bitmask.

Computing the Correlation Across the Infill Area Using Arcs

To this point, the following has been determined: f1-monotonic arcs that tightly surround the infill area, the fmin and fmax, and the range of f1 values over the infill area. The correlation across the infill area using these values may now be evaluated. In one embodiment, this may be performed as outlined in the following pseudo-code.

```
sum = 0;
nTerms = 0;
for (f = fmin; f <= fmax; f += 0.5)
{
    set the crossings to an empty list;
    for (all arcs a)
    {
        if (a's f1 range contains f)
        {
            look up f2 and pix value for f in a;
            add a crossing at f2, storing pix and a's plus/minus flag;
        }
    }
    sort crossings on f2;
    for (all pairs c1 and c2 of crossings)
    {
        delta = c1->pix - c2->pix;
        sum += delta * delta;
        nTerms++;
    }
}
correlation = sum / (float)nTerms;
```

While this technique is relatively straight-forward, there are some issues that must be addressed to get it right. First, determining if an arc contains a given f1 value (f) can work in the following way: get the elements p1 and p2 at the beginning and end of the arc; a "fuzzy" comparison may then be employed: a's range contains f if: (p1→f1−ϵ<f) and p2→f1−ϵ>f), where epsilon may be a predetermined tolerance threshold allowing for the performance of "fuzzy" comparisons. In one embodiment, epsilon may be 0.01.

This approach enforces a closed bottom end of the f1 range and an open top end of the f1 range. This, in turn, can prevent double intercepts at places where plus and minus arcs meet at a single shared f1. The next issue to consider is that the number of crossings should be non-zero and even. This means that each pair of crossings after the sort must be a plus and minus crossing. If this is not true, it may sometimes be necessary to swap a pair of crossings that occur within epsilon of the same f2 value. This can be due to the inherent (albeit slight) inaccuracy of floating point operations.

A third issue that should be considered is the lookup of f2 and pix from an arc whose f1 range contains f. Since the arc is sorted on f1, this amounts to either a linear or binary search for the neighboring path points with f1 values that contain f. Once found, the fraction between the two points that yields the appropriate f1 value may then be determined. Using that fraction the f2 and pix values may be linearly interpolated.

Accomplishing the Infill Using Arcs

Filling in the red recognition channel inside the infill area is similar to performing the correlation (Step 1408). Illustrative pseudocode for performing this operation is shown here.

```
for (all pixels p in the infill area)
{
    compute pf1, the f1 value at p;
    compute pf2, the f2 value at p;
    set the crossings to an empty list;
    for (all arcs a)
    {
        if (a's f1 range contains pf1)
        {
            look up f2 and pix value for pf1 in a;
            add a crossing at f2, storing pix and a's plus/minus flag;
        }
    }
    sort crossings on f2;
    for (all pairs c1 and c2 of crossings)
        if (c1->f2 <= pf2 && pf2 <= c2->f2)
            break;
    compute frac, the fraction between c1->f2 and c2->f2 of pf2;
    using frac, interpolate between c1->pix and c2->pix
        to compute the value of pix at p;
    store pix into the red recognition channel at p;
}
```

This approach has similar issues to contend with as did the correlation, and they are solved in similar ways. An advantage of choosing the proper angle for infill is that a more realistic and natural looking infill may be generated. Pupils are generally convex, so it desirable to determine an infill angle that will "gloss over" a specular shine "hole" in a red-eye recognition channel. This infill angle should be parallel to the edge of the pupil where the specular shine hole occurs. The correlation process described above should arrive at the proper infill angle, and the infill may then take advantage of this to produce the most seamless "healing" of the hole.

Determining the Alpha Mask

Now that the type of case has been determined, the corresponding prominence bitmask may be used as an approximation to the alpha mask (Step 1410). In this embodiment, alpha mask refers to an 8-bit mask containing alpha opacity values, where a value of 255 represents fully opaque, and a value of 0 represents fully transparent. Two methods of doing this are described below. If one method fails, the other method may be used as a backup.

Method 1—Direct Segmentation

Method 1, i.e., direct segmentation, segments the edge of the pupil in the recognition bitmask by using a starburst method and a snake-tracing method. This method begins by approximating the prominence center. This can be done by extracting the centroid of the prominence bitmask. The radius may then be approximated using the bitmask area as follows:

$$\text{radius} = \sqrt{\frac{\text{area}}{\pi}}.$$

Once the approximate center and radius have been determined, a more "realistic" radius may be determined by using a "starburst" algorithm. In one embodiment, the starburst algorithm works by sending out a fixed number of rays, each at a different angle. Five rays may be used, for example. Each time, the centroid location may be modified a small amount, e.g., the centroid is first placed at the determined central pixel, then up one pixel from the central pixel, then down one pixel from the central pixel, then left one pixel from the central pixel, and then right one pixel from the central pixel. This can minimize the error from linearly interpolating samples along the ray. Along each ray, the location of the first maximum gradient along the ray may be located. Each ray's length can be determined by using the radius estimate. Once all the gradient maximum points have been gathered, the mean and standard deviation of the distances from the center to each gradient maximum point may be determined.

Figure 15:
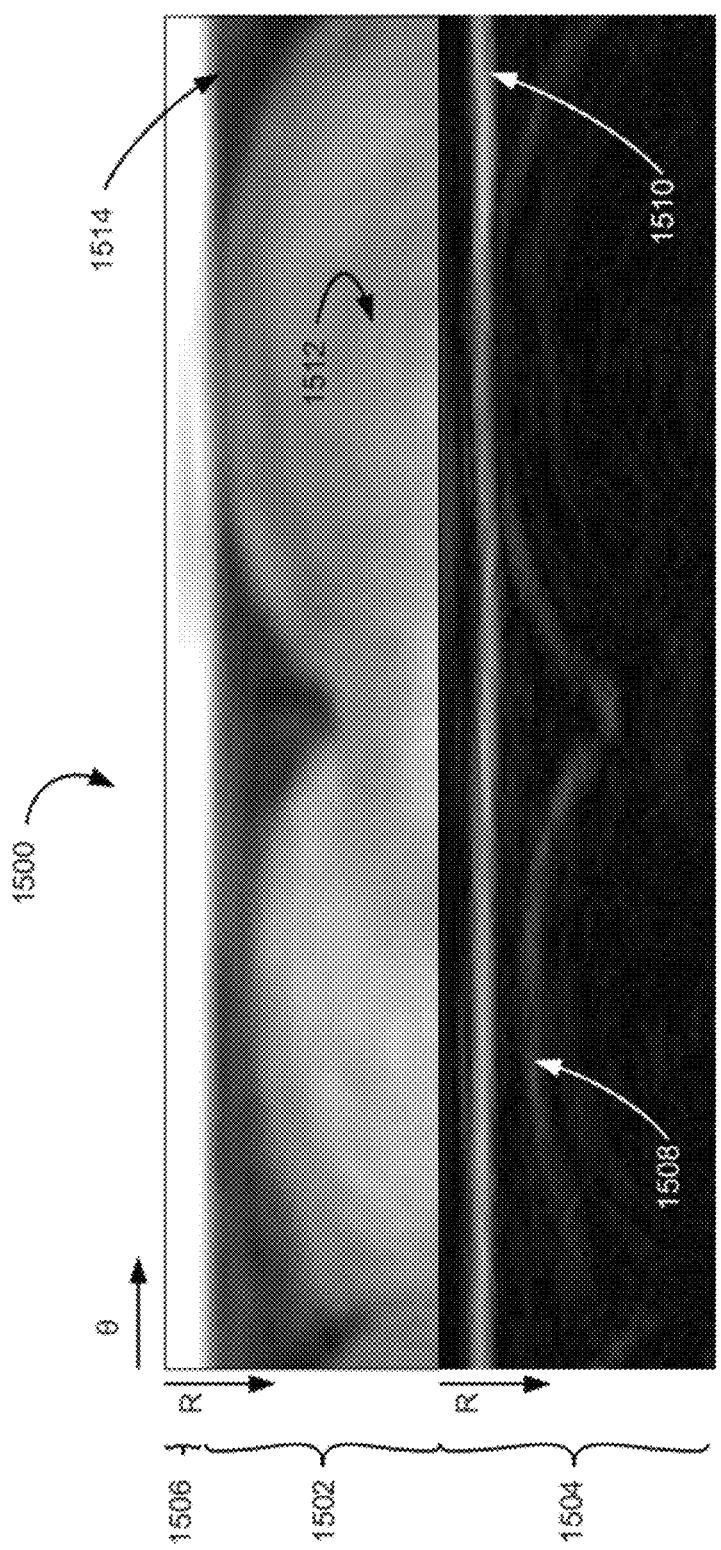
FIG. 15 illustrates a polar gradient map, in accordance with one embodiment.

It has been found that the mean distance is a good estimate of the prominence radius. Utilizing that data, an unwrapped polar gradient map 1500 is computed, with the objective of mapping the prominence's boundaries, as is shown in FIG. 15. The width of this map is the number of angles (internally called nAngles) and can be well approximated by: nAngles=round(2.0*PI*mean). The height of the polar gradient map (internally called maxdist) may also be calculated in the following way:

maxdist=round(mean+2.5*standardDeviation)+1,

Each horizontal line in the unrolled gradient map may be referred to as a snake. To segment the prominence, the snake with the highest contrast is followed and then unwrapped into a circular curve. The mean and standard deviation can indicate which rows are most likely to be the snake of interest.

For each column of the unrolled gradient map (angle), all of the gradient maximum points along that column can be extracted, keeping track of the magnitude of the gradient and the row position of the gradient maximum. These gradient maximum points may be stored in a "hopper" data structure, sorted on gradient magnitude. As used herein, a hopper data structure is defined as a structure that receives values as input, compares the input values with the values already stored in the data structure, and then stores a predetermined number, n, of the largest input values in the structure, replacing the smallest value in the data structure each time a value larger than the smallest value currently stored in the hopper is input to the hopper.

As shown in FIG. 15, element 1502 represents the unrolled intensity map of a red recognition channel of an exemplary red-eye artifact, and element 1504 represents the unrolled gradient map of the red recognition channel of an exemplary red-eye artifact. Element 1506 represents the unwrapped prominence area. Element 1508 represents the edge of the eye. Element 1510 represents the edge of the pupil (i.e., red-eye artifact). Element 1512 represents the eye itself, whereas element 1514 represents the edge of the prominence. As is shown on FIG. 15, the angle of evaluation, Θ, increases from left to right, and the radius of evaluation, R, increases from top to bottom on the respective polar maps.

Connection Energy

The notion of connection energy, that is, a measure of how difficult it would be to connect two or more gradients, given their neighborhood of gradients, is introduced here. In this context, connection energy has a low value when gradients connect easily (i.e., when there is a perceived coherence), and a high value when the gradients do not connect easily (i.e., when there is a perceived loss of coherence or a break). To improve connection reliability, three gradients: g1, g2, and g3 at successive angles will be considered (g1 is at the end of the snake, and the process is estimating the connection energy to g2). The connection energy may be given by e=energy(g1, g2)+energy(g2, g3)+energy(g1, g3).

The energy function between two gradients g1 and g2 is given by: grd=abs(g1→gradient−g2→gradient)/((g1→gradient+g2→gradient)*0.5); dd=abs(g1→distance−g2→distance)/((g1→distance+g2→distance)*0.5); di=abs(g1→intensity−g2→intensity); energy(g1, g2)=grd+dd+di;

Here, the gradient field is the actual gradient at the point. The distance field is the distance from the polar center of the gradient point. The intensity field is the (normalized) intensity measured one pixel outside the gradient point. Once the gradient points have been captured at each angle, the following method, shown in pseudocode, may be employed to gather the snakes:

```
while (some gradient is still unused)
{
    find the first angle index ai with an unused gradient g;
    start angle index = ai;
    initialize a new snake s;
    e = -1;
    while (1)
    {
        add g to the end of s;
        increment angle index ai, wrapping around if necessary;
        if (ai == start angle index)
        {
            mark s complete and adjust the energy function across
            the wrap point;
            break;
        }
        compute the gradient g at angle ai with the minimum connection
        energy,
        e;
        if (there is no g)
            break;
    }
}
```

To calculate the connection energy from g1 to the next gradient point, all unused gradient points g2 in the next angle's hopper may be evaluated. And then, all unused gradient points g3 in the hopper may be evaluated for the subsequent angle (unless that is the start hopper, in which case only the start gradient point of the snake as a legal g3 may be considered). For all triples (g1, g2, and g3), connection energy is evaluated. The triple with the least connection energy is selected. It's possible that there are no legal triples, in which case the scan of that snake may be terminated.

At the end, if there are any complete snakes, the snake with the largest gradient sum is selected. Then, the maximum connection energy for all gradient points on the snake may be determined. If that connection energy is greater than 1.5, the snake does not have sufficient confidence and the snake tracing method fails. If the maximum connection energy is not greater than 1.5, the snake may be adjudged to be a winning snake. The snake may then be converted to an outline whereafter the alpha mask may be determined. If the snake tracing method fails (empirical evidence has shown it to fail in about 20% of the cases), then another method may be used to compute the alpha mask.

Method 2—Bitmask Expansion

Method 2, i.e., bitmask expansion, expands the prominence bitmask into an alpha mask, using the recognition channel elements nearby. This method begins by allocating an alphaMask bitmap and also allocating an initializedAlpha bitmask. These are both the same size as the recognition channel and the prominence bitmask. The initializedAlpha bitmask and the alpha mask may each be set to all '0's initially. Then, all the border pixels in the prominence bitmask can be iterated over. For a pixel to be considered a border pixel in the prominence bitmask, the center pixel must be set and one of its 4-connected neighbors must be clear.

Figure 11B:
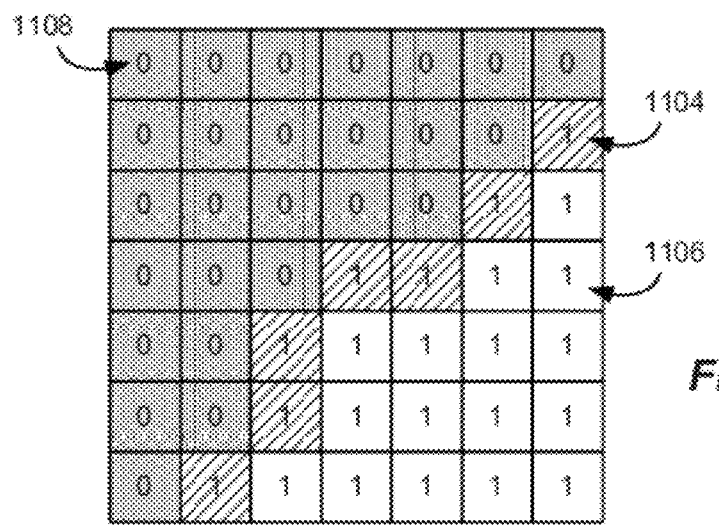
FIG. 11B illustrates a plurality of border pixels in a bitmask, in accordance with one embodiment.

As shown in FIG. 11B, shaded pixels 1108 represent '0' pixels, i.e., pixels not a part of the bitmask; crosshatched '1' pixels 1104 represent border pixels that are a part of the bitmask; and white '1' pixels 1106 represent non-border pixels that are a part of the bitmask. A border pixel may be defined as a pixel where at least one of the pixels above, below, to the left, or to the right of the pixel are not a part of the bitmask.

For a recognition channel pixel, s5, that corresponds to prominence bitmask pixel, b5, that is on the border, the x and y components of the Sobel gradient can be computed and used to determine the sine, si, and cosine, co, of the direction perpendicular to the desired alpha mask edge at that spot. The Sobel gradient is a well-known gradient operator that is utilized in this embodiment, although any suitable method could be used to calculate the gradient. The soft averages inside and outside the recognition channel, i.e., two pixels inside and three pixels outside the border, and also the unsoftened value of the pixels from the recognition channel at the border are evaluated. At pixel (r,c), alpha may be resolved by determining its pro rata value. As shown in the pseudocode below, if a "high" value is taken from inside the prominence, and a "low" value is taken from outside the prominence, and a pixel value p is taken at the current location at or near the edge of the alpha bitmask, s1 through s9, then alpha value would be (if measured as a value between 0 and 1): alpha=(p−low)/(high−low); if (alpha<0) alpha=0 else if (alpha>1) alpha=1; This value can be stored in alphaMask and the corresponding initializedAlpha bit gets set. Values for each of the eight surrounding pixels may be similarly resolved.

```
for (all rows r)
{
    for (all columns c)
    {
        // load bits b1 - b9 from the prominence bitmask centered on (r,c)
        b1 = pb[r−1,c−1]; b2 = pb[r−1,c]; b3 = pb[r−1,c+1];
        b4 = pb[r,c−1]; b5 = pb[r,c]; b6 = pb[r,c+1];
        b7 = pb[r+1,c−1]; b8 = pb[r+1,c]; b9 = pb[r+1,c+1];
        if (b5 == 1 && b2 + b4 + b6 + b8 != 4) // border
        {
            // load elements s1 - s9 from the recognition channel centered
            on (r,c)
            s1 = rc[r−1,c−1]; s2 = rc[r−1,c]; s3 = rc[r−1,c+1];
            s4 = rc[r,c−1]; s5 = rc[r,c]; s6 = rc[r,c+1];
            s7 = rc[r+1,c−1]; s8 = rc[r+1,c]; s9 = rc[r+1,c+1];
            xgrad = (s3 + s6 + s6 + s9) − (s1 + s4 + s4 + s7);
            ygrad = (s7 + s8 + s8 + s9) − (s1 + s2 + s2 + s3);
            len = xgrad*xgrad + ygrad*ygrad;
            if (len == 0)
                continue;
            norm = 1.0 / sqrt((float)len);
            co = (float)xgrad * norm;
            si = (float)ygrad * norm;
            p1 = point(round(c + 2 * co),round(r + 2 * si));
            p2 = point(round(c − 3 * co),round(r − 3 * si));
            inside = soft average of recognition channel at p1;
            outside = soft average of recognition channel at p2;
            if (inside == outside)
                continue;
            edge = s5;
            alpha = clamp((edge − outside) / (inside − outside), 0, 1);
            alphaMask[r,c] = alpha;
            initializedAlpha[r,c] = 1;
            resolve alpha at s1, s2, s3, s4, s6, s7, s8, and s9;
        }
    }
}
```

To determine a soft average of recognition channel pixels s at p1, (r1, c1), the following method may be used:
Load elements t1-t9 from the recognition channel centered on (r1,c1):
t1=rc[r1−1,c1−1]; t2=rc[r1−1,c1]; t3=rc[r1−1,c1+1];
t4=rc[r1,c1−1]; t5=rc[r1,c1]; t6=rc[r1,c1+1];
t7=rc[r1+1,c1−1]; t8=rc[r1+1,c1]; t9=rc[r1+1,c1+1];
s=(4*t5+2*(t2+t4+t6+t8)+t1+t3+t7+t9+8)/16;

To resolve each of the eight surrounding elements, the following method may be used for each element. The sample may then evaluated at the neighboring location (ri, ci) from the recognition channel:

```
sample = rc[ri,ci];
alpha1 = clamp((sample − outside) / (inside − outside), 0, 1);
if (initializedAlpha[ri,ci] == 1)
{
    alpha = alphaMask[ri,ci];
    alphaMask[ri,ci] = (alpha + alpha1) / 2;
}
else
{
    alphaMask[ri,ci] = alpha1;
    initializedAlpha[ri,ci] = 1;
}
```

This merges a value into an alphaMask pixel using averaging. Once this is done, the missing values may be filled in:

```
for (all rows r)
{
    for (all columns c)
    {
        if (!initializedAlpha[r,c] == 0)
        {
            if (pb[r,c] == 1)
                alphaMask[r,c] = 255;
            else
                alphaMask[r,c] = 0;
        }
    }
}
```

The final stage in alphaMask adjustment for this method may be a simulated annealing step. This can fix some rough edges. Simulated annealing may be accomplished by applying a slight blur (e.g., a Gaussian blur with standard deviation 0.9) and then increasing contrast (by about 1.25 around the center alpha value of 0.5).

Red-Eye Repair

After extracting the alphaMask, the artifact may be repaired. In the red-eye case, this usually amounts to processing the area under the alphaMask. A simple form of repair is: red=green=blue=min(green, blue). This can normally fix any red-eye. In some embodiments, the min(green, blue) value may be stored into all three components so that the result may be neutral in color (and not bluish or greenish). Other repair algorithms use: red=(green+blue)/2.

This approach has some problems in practice. For example, the results using this form of repair are sometimes bluish or greenish in hue. They may also, in general, be too light. An advantage of these two methods is that they preserve the specular shine (which is, in general, included in the alpha-Mask).

The resultant color may then be mixed with the image using the alphaMask. Most of the time the tonality (luminance) of the resultant pupil is satisfactory. But there are cases, particularly when fixing an image that has been color corrected or that has been taken using a sensor with excessive color crosstalk, that may need to be adjusted in tonality (usually towards the darker shades). To do this, a transfer table may be employed. Properly constructed, the transfer table can preserve the specular shine while making the pupil the desired shade otherwise. Here is the repair code, where nred, ngreen, and nblue are normalized (i.e., run through a transfer table so that the tonality (shades) in the pupil can conform to the desired tonality) color values:

```
for (all pixels p with alphaMask value alpha)
{
    if (alpha > 0)
    {
        extract red, green, and blue components from pixel p;
        nred = ngreen = nblue = transferTable[min(green, blue)];
        red += (nred - red)*alpha;
        green += (ngreen - green)*alpha;
        blue += (nblue - blue)*alpha;
        store red, green, and blue components back into pixel p;
    }
}
```

Determining Pupil Tonality

In a red-eye case, the pupil tonality may be computed before repair by estimating the repair value (actually the single monochrome value) and compiling a histogram of those values. To determine the repaired pupil tonalities under the alpha mask (before the repair occurs), the following pseudocode may be used:

```
set the histogram to empty;
for (all pixels p with alphaMask value alpha)
{
    if (alpha > 0)
    {
        extract red, green, and blue components from pixel p;
        value = min(green, blue);
        add value to the histogram;
    }
}
```

Once the histogram has been computed, "lo," "med," and "high" template values may be calculated as follows: the first non-zero value in the histogram is set to "lo;" the value in the histogram below which 50% of the values fall is set to "med;" and the value in the histogram below which 95% of the values fall is set to "high." In some embodiment, to better preserve specular shines, both the "hi" value, as well as the "matchhi" value (which will be described below) may be set to a fixed threshold. In a preferred embodiment, the "hi" and "matchhi" fields in the pupil tonality templates are set to a fixed threshold, typically 240.

Computing the Transfer Table

Assuming a pupil tonality template (e.g., template values of "lo," "med," and "hi") and a template to match to (e.g., template values that will be called matchlo, matchmed, and matchhi):

```
for (all tonalities t)
{
    if (t < lo)
        t2 = (t * matchlo) / lo;
    else if (t < med)
        t2 = matchlo + ((t - lo) * (matchmed - matchlo)) /
            (med - lo);
    else if (i < hi)
        t2 = matchmed + ((t - med) * (matchhi - matchmed)) /
            (hi - med);
    else
        t2 = matchhi + ((t - hi) * (MAXTONALITY - matchhi)) /
            (MAXTONALITY - hi);
    table[t] = t2;
}
```

This template embodies a piecewise linear interpolation that can preserve the specular shine while moving the base tonality to a desired value. In a typical image, tonalities range from 0 to 255, which means MAXTONALITY is 255 in a typical image.

Golden-Eye Repair

For the golden-eye case, there are at least two options. A first option is to treat it as a white-eye case. Once the alpha mask is extracted, the white-eye repair routines may be used to fix it. This may be used with some cameras primarily because many times it is a golden-eye or a white-eye case, and the golden-eye cases that do occur rarely have recoverable specular shines.

A second option is to treat a golden-eye case as a red-eye case. Once the alpha mask is extracted, the red-eye repair routines may be used to fix the golden-eye. Golden-eye repair is similar to red-eye repair except that all of the cases require a transfer table to adjust the result pupil tonality. Also, special care should be exercised to assure that the specular shine, if present in the golden-eye pupil, is preserved after repair. The standard template used by golden-eye has a lo of 4.7%, a reed of 8.6%, and a hi of 21.6%% for an image at gamma 2.2.

However, it should be noted that running the result of a golden-eye repair through this transfer table can be a quick way to generate new artifacts. These artifacts stem from the fact that any demosaicing and sharpening artifacts can be amplified by this technique.

Interactively Fixing Differences in Tonality

Often, one eye in an image has a noticeably different tonality from another eye in the image, even when they belong to the same individual: in some examples, the subject's left eye may be noticeably lighter than the right eye. This can be fixed in two ways.

The first is to automatically match up the repairs into left-right pairs, and then to re-repair the lighter pupil using the template for the darker pupil. A second approach allows the user to explicitly repair it as well, by tapping on one repair and dragging it to the other repair. This unique addition to the user interface has the advantage of simplicity and naturalness. The major ramification of this approach is that the host application needs to keep track of the repairs done on the current image. This would also be true if the first approach were taken, since the matching of left-right pairs also requires knowledge of the repairs before matching.

White-Eye Repair

Figure 16:
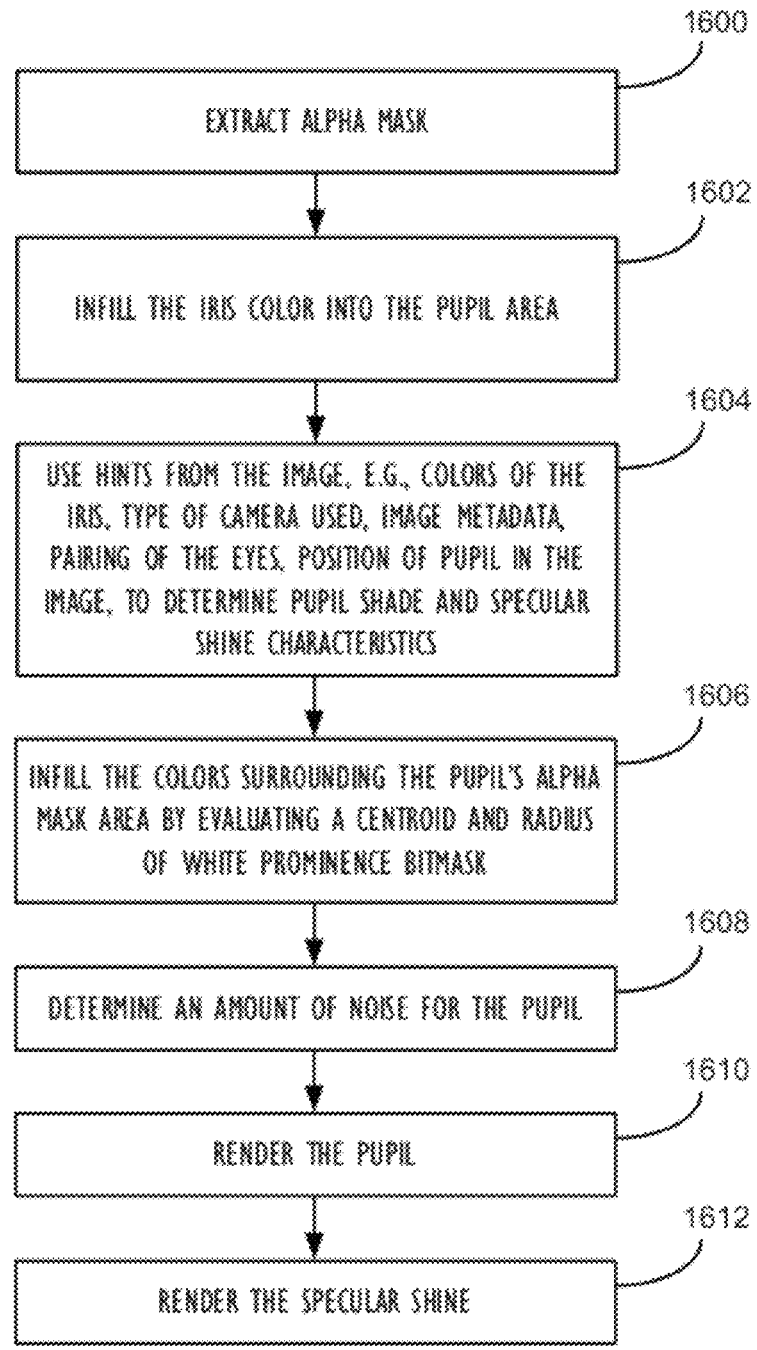
FIG. 16 illustrates a process for white-eye repair, in accordance with one embodiment.

White-eye repair is the most difficult form of repair. A flowchart showing the general steps for white-eye repair is shown in FIG. 16. First, the alpha mask may be extracted (Step 1600) and the iris color may be infilled into the pupil area (Step 1602). Since the pupil is entirely white with no articulations, there is no recourse but to render the pupa on top, using the alphaMask as a template. To avoid a visible matte edge, this process may first infill the iris colors into the pupa area. The pupil area may then be rendered over it in an appropriate shade and with an appropriate amount of noise. Unfortunately, since the specular shine cannot be recovered in this case, the process may render an approximation of specular shine as well.

Doing this much manipulation on an image can sometimes result in a photographically unreasonable-looking result. To avoid this, the repair process preferably uses whatever hints the image provides, including the colors of the surrounding iris, the type of camera used, the image metadata, the pairing of the eyes, and the position of the pupa within the image (Step 1604).

Determining the Appropriate Shade for the Pupil

To determine the appropriate shade for the pupil, the average minimum Y sample (i.e., luminance) along the border of the white recognition bitmask may be determined (this can be done in the infill step for convenience). Once averaged, the tonality that is at 50% of that average shade can be used to make the pupil tonality, pupilY.

Infilling

It may be desirable to avoid a noticeable matte edge in this case. To do that, the colors surrounding the pupil's alphaMask area may be infilled. First a centroid location for the white prominence bitmask can be determined. Then the radius, i.e., the maximum distance that any set bit in the white prominence bitmask can be from this centroid, can be determined. A starburst approach may then be used to send evenly-spaced rays out from the centroid. In one embodiment the number of rays in the starburst, nRays, may be determined by using the formula:

nRays=round(4.0*M_PI*radius); if (nRays<6) then nRays=6.

This generally ensures at least two rays per pixel on the border of the white prominence bitmask. On each ray, the process may scan outwards from the center for the minimum value (minsample) and maximum value (maxsample) in the corresponding white recognition bitmap within a reasonable range. At the minimum value point, the corresponding CbCr color (minCbCrSample) may also be extracted. CbCr refers to the YCbCr color channel, wherein Y is luminance, and Cb and Cr are the blue-difference and red-difference chroma components, respectively. In one embodiment a threshold may then be evaluated using the following formula:

threshold=(minsample*19+maxsample+10)/20;

if (threshold==minsample) threshold++.

Figure 17:
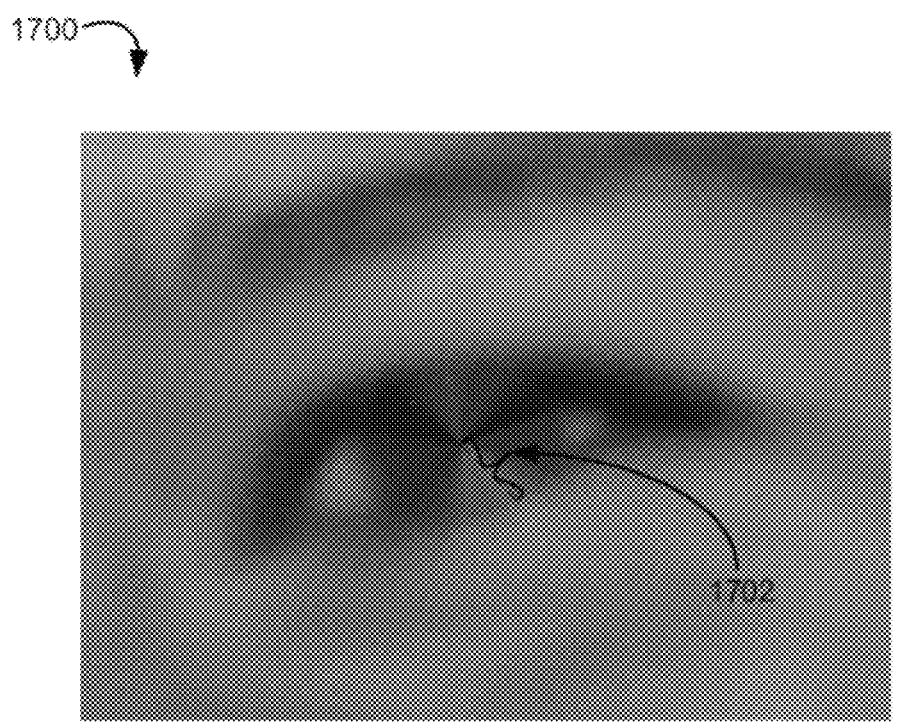
FIG. 17 illustrates an example of radial infill, in accordance with one embodiment.

During infill, the objective is to search outwardly from the centroid and find some kind of sample that forms a minim value in luminance (recall that the white recognition bitmap is really the image's Y, or luminance, channel), and then to fill in from that point using that sample (i.e., the full color sample found there). This creates a radial pattern of pixels that repeats inwardly, similarly the radial striations in the human iris. An example of radial infill 1700 is shown in FIG. 17. Notice the change in tonality along radial infill line 1702. To achieve the desired infill, the process can scan outward from the centroid, first loading the sample from the white recognition bitmap, then writing the minsample and minCbCrSample values to the outputY and outputCbCr bitmasks. When the sample exceeds the computed threshold, this operation may stop. This leaves the output Y and CbCr bitmaps completely (radially) infilled with appropriate sample data from the iris. During this operation, the average minsample value over all rays may be computed. This value may then be divided by two to get the pupil tonality value.

Determining the Amount of Noise for the Pupil

To determine the appropriate amount of noise for the pupil, image metadata may be examined (Step 1608). Using the noise model for the camera that took the picture, and the picture's ISO and exposure time, the noise level noiseScale near the camera's black level may be determined. The noiseScale can be measured as samples in a gamma-corrected space in the gamma that the image uses (usually 2.2).

Rendering the Pupil

To render the pupil, a pixel of the appropriate shade pupilY (and varied randomly by the appropriate amount of noise) may be stored under each pixel of the alphaMask (using the alphaMask as an interpellant) (Step 1610). Note that the urand operator in the pseudocode below returns a random number between 0 and 1, inclusive.

```
for (all pixels p with alphaMask value a)
{
    if (a > 0)
    {
        delta = (urand( ) – 0.5) * noiseScale;
        p += (pupilY + delta – d) * a;
        store max(p, 0);
    }
}
```

The CbCr layer may also be written to provide a neutral-colored pupil. To do so, the CbCr layer can get written to whatever value is used in the implementation to signify a neutral color (typically 128, 128).

Rendering the Specular Shine

The first step to rendering the specular shine is to decide a photographically appropriate place to put it. Accordingly, it is advantageous to know the position of the flash unit with respect to the lens. For digital single-lens reflex (DSLR) cameras this is usually above the lens. For point-and-shoots and camera phones, the position of the flash varies. For example, if the flash is to the right of the lens, the specular shine is generally to the left. Information about the flash's position may then be combined with metadata that tells the orientation of the camera when it took the picture (imageOrientation). This information may then be used to displace the specular shine from the center of the pupil (pupilCenter). A function of the offset of the pupil center from the center of the image may also be used as input for computing a displacement, i.e., determine the offset from the center of the picture (imageCenter) to the pupil center as a vector. Negate the vector and divide its length by half the diagonal length of the image (halfDiagonalSize). Multiply the resultant vector by the pupil radius, and then by a constant value (e.g., 0.6). This vector can now be used as a reasonable offset for the specular shine from the center of the pupil.

Here is pseudocode to determine the specular shine center, in accordance with one embodiment (Step 1606):

```
pupilCenter = centroid(prominenceBitmask);
v = 0.6 * (imageCenter – pupilCenter) / halfDiagonalSize;
pupilRadius = sqrt(area(prominenceMask)/pi);
if (imageOrientation == 6)
    v.y += pupilRadius * 0.5;
else if (imageOrientation == 3)
    v.x += pupilRadius * 0.5;
else if (imageOrientation == 1)
    v.x -= pupilRadius * 0.5;
else if (imageOrientation == 8)
    v.y -= pupilRadius * 0.5;
specularShineCenter = pupilCenter + v;
```

The second step to rendering the specular shine is to determine its size (specularRadius) (Step 1606). One way to do this is as follows: specularRadius=0.14*pupilRadius.

The specular shine may now be rendered (Step 1612). Pseudocode according to one embodiment is provided here:

```
radius = specularRadius * 4.0; // account for dropoff
specularRadius *= 1.0 – softness; // reallocate for softness
specularY = pupilY + (MAXIMUMY – pupilY) * (0.33 + (1.0 –
softness)*0.67);
iradius = (int)ceil(radius);
// compute bounding rectangle of specular shine
minx = pupilCenter.x – iradius; maxx = pupilCenter.x + iradius + 1;
miny = pupilCenter.y – iradius; maxy = pupilCenter.y + iradius + 1;
// clip to the image bounds
if (minx < 0) minx = 0;
```

-continued

```
if (maxx > windowwidth) maxx = windowwidth;
if (miny < 0) miny = 0;
if (maxy > windowheight) maxy = windowheight;
normFactor = 1.0 / (radius - specularRadius);
for (all pixels p at location loc inside [minx, miny, maxx, maxy])
{
    // determine distance from cenx/ceny
    dist = distance(loc, pupilCenter);
    if (dist < specularRadius)
        *d = specularY;
    else if (dist < radius)
    {
        // compute falloff
        y = p;
        fraction = (radius - dist) * normFactor;
        f1 = 3*fraction^2 - 2*fraction^3;
        f2 = fraction^6;
        fraction = f2 + softness*(f1 - f2);
        y += (specularY - p) * fraction;
        store y;
    }
}
```

Here, MAXIMUMY is 250 for an 8-bit image. Also, softness is typically 0.1. Finally, windowwidth and windowheight define the size of the image being modified (or the size of the subrectangle of the image being modified).

Complex Repair

In some images, eye pairs show extremely different artifacts. For example, in the case where the left eye is a red-eye case, and the right eye is a white-eye case, the specular shines shown in each of the eyes after repair can be very different, and also improbable. In such an example, the repair can have a better quality if the specular shine in the red-eye repair is copied into the white-eye repair. In some cases, it may be preferable to use the red-eye highlight because it shows the correct position, size, and shape of the pupil.

One way to fix this differential specular shine condition is to automatically match up the repairs into left-right pairs, and then to re-repair the white-eye repair using the specular shine from the red-eye repair. Another approach allows the user to explicitly repair it by clicking on one repair and dragging it to the other repair. The major ramification of this second approach is that the host application needs to keep track of the repairs done on the current image. This would also be true if the first approach were taken, since the matching of left-right pairs also requires knowledge of the repairs before matching.

IV. Automatic Red-Eye Repair Techniques

Since red-eye repair processes are dependent upon knowing the position (and size) of each artifact to be repaired, in an automatic mode, the algorithm must be directed. This means knowing the positions of the eyes in the scene, which in turn means locating the faces.

Face detection is one way to get eye positions in an image with some degree of certainty. To be useful in this context, a face detector should determine and return the eye positions. With the eye positions comes another useful bit of information: the interocular distance (IOD). Pupil sizes and other features depend upon this distance, and can be found within a certain range of sizes with respect to the IOD.

Figure 18:
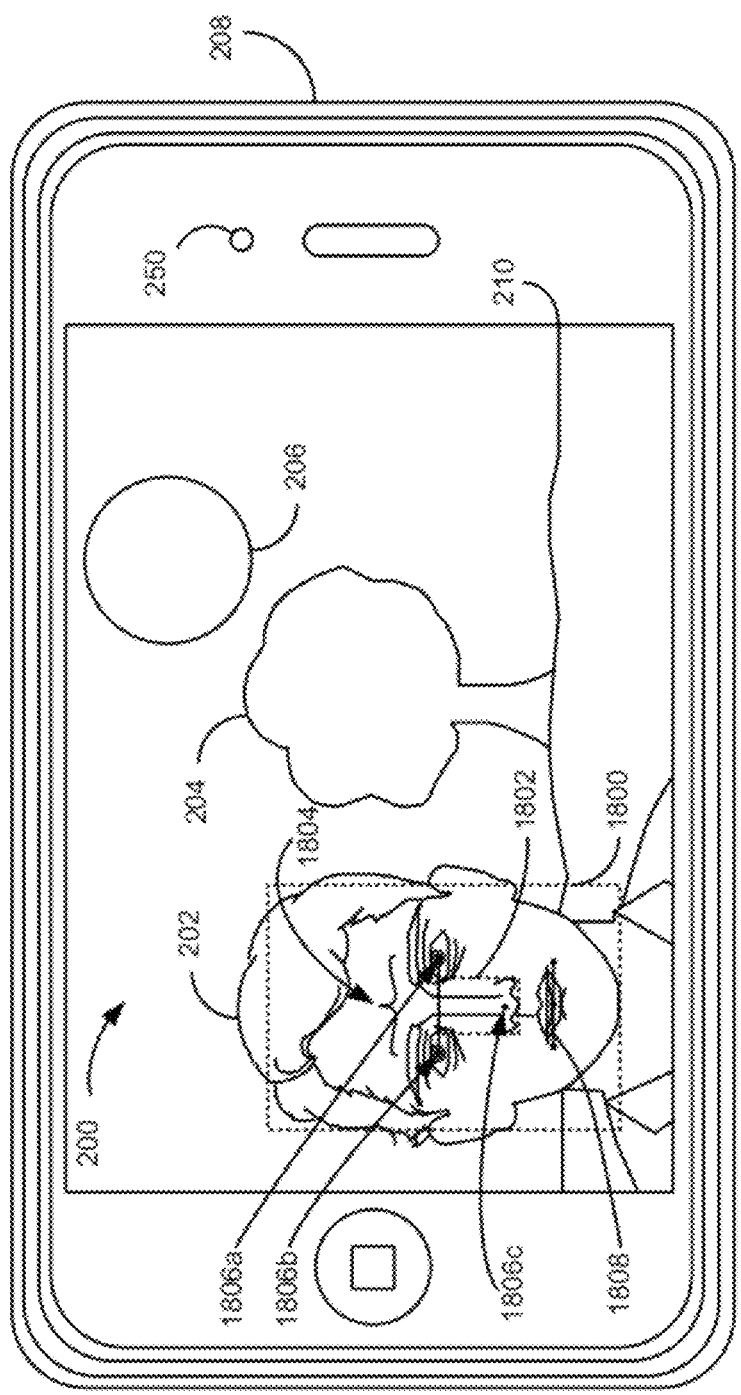
FIG. 18 illustrates an example of the use of face detection to determine interocular distance (IOD), in accordance with one embodiment.

Referring now to FIG. 18, an example of the use of face detection to determine IOD is shown, in accordance with one embodiment. In the example of FIG. 18, the face detection algorithm has located a bounding box 1800 that it has determined contains a face. Within bounding box 1800, the face detection algorithm has identified: a point, 1806*a*, corresponding to the right eye (as viewed on the image capture device's display); a point, 1806*b*, corresponding to the left eye (as viewed on the image capture device's display); a point, 1806*c*, corresponding to the nose in the face; a bounding box 1802 corresponding to the extent of the nose in the face; and a set of points and vector, 1808, corresponding to the mouth of the face. The vector 1804 between eyes 1806*a* and 1806*b* corresponds to the IOD. As mentioned above, the IOD may help a repair process determine the likely size of pupas and/or other features in the face.

Like most heuristic algorithms, face detection is not perfect. Two kinds of errors may typically occur: false face detection (i.e., "false positives") and failure to detect a face (i.e., "false negatives"). For example, if a balloon is determined to be a face (i.e., a "false positive"), then a shine on the balloon might be found to be a white-eye artifact. Likewise, if a face is simply not detected (i.e., a "false negative"), then any red-eye present in the image will not be repaired.

Improving Red-Eye Accuracy

With face detection, accuracy of red-eye repair can be improved by using information about a face's eye locations. The first step of automatic red-eye repair according to one embodiment is face detection. The execution of a face detection algorithm over an image returns a list of faces. For each face, some face location information and metrics are returned, e.g., the locations of the left and right eye (as seen in the image).

Unlike with manual, i.e., "tap-to-fix" red-eye repair techniques, automatic red-eye repair techniques need to first determine, for each eye, whether there even is an artifact present in the image. To make such a determination, a prominence search may be conducted, since the artifacts typically glow some bright color. To allow for a search around both eyes, a portion of the image around both eyes may be examined.

Figure 19:
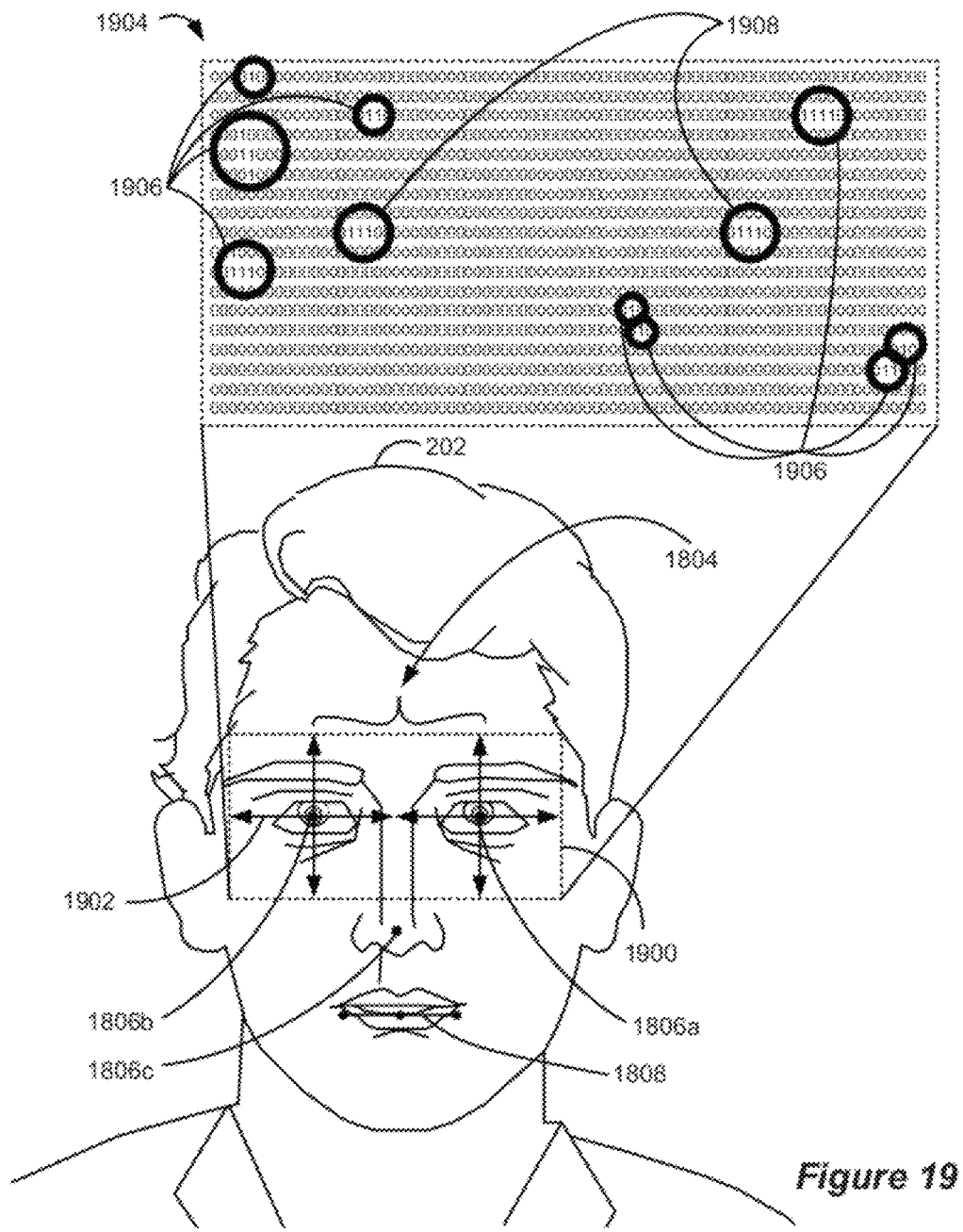
FIG. 19 illustrates an example of the use of face detection and interocular distance (IOD) to determine a search area and prominence search bitmask, in accordance with one embodiment.

Referring now to FIG. 19, an exemplary search area 1900 around located eyes 1806*a*/1806*b* in an image is shown, in accordance with one embodiment. The dimensions of search area 1900 may be determined at least in part by creating rectangles surrounding each of the located eyes, wherein each rectangle has a dimension 1902 extending in both the horizontal and vertical directions away from the center of the located eye (e.g., the eye point as identified by the face recognition algorithm—which, in practice, may not be the "center" of the actual eye). In addition to the rectangles surrounding the located eyes, some extra space may be added along each direction to increase the chances of locating the prominences in the search area. The amount of extra space used around the rectangle surrounding the two eye points may be informed by the typical accuracy of the face detector's eye positions. In some embodiments, this is between 8 and 16 percent of the IOD. The following empirically determined expression may be used to determine the maximum repair search distance, given the IOD:

$$maxdist = IOD*(0.08 + 50.0/(IOD+150.0))$$

it is also helpful to have an idea or estimate of how big the artifacts are likely to be, since that can aid in the search process. It can also help with rejection of large areas that aren't red-eye artifacts at all. To do this, the ranges of reasonable red-eye artifact sizes are estimated based on the IOD. Note that the size of an artifact may be defined in the following way, given NPIXELS, the number of pixels inside the artifact:

$$size = 2\operatorname{sqrt}(NPIXELS/pi).$$

The minimum and maximum sizes may then be calculated in the following empirically determined way, given the IOD:

$$lowerRepairSizw = IOD*(0.08 + 1.0/(IOD-20.0));$$

$$upperRepairSize = IOD*(0.13 + 25.0/(IOD+20.0)).$$

Illustrative Automatic Red-Eye Repair Process

Figure 20:
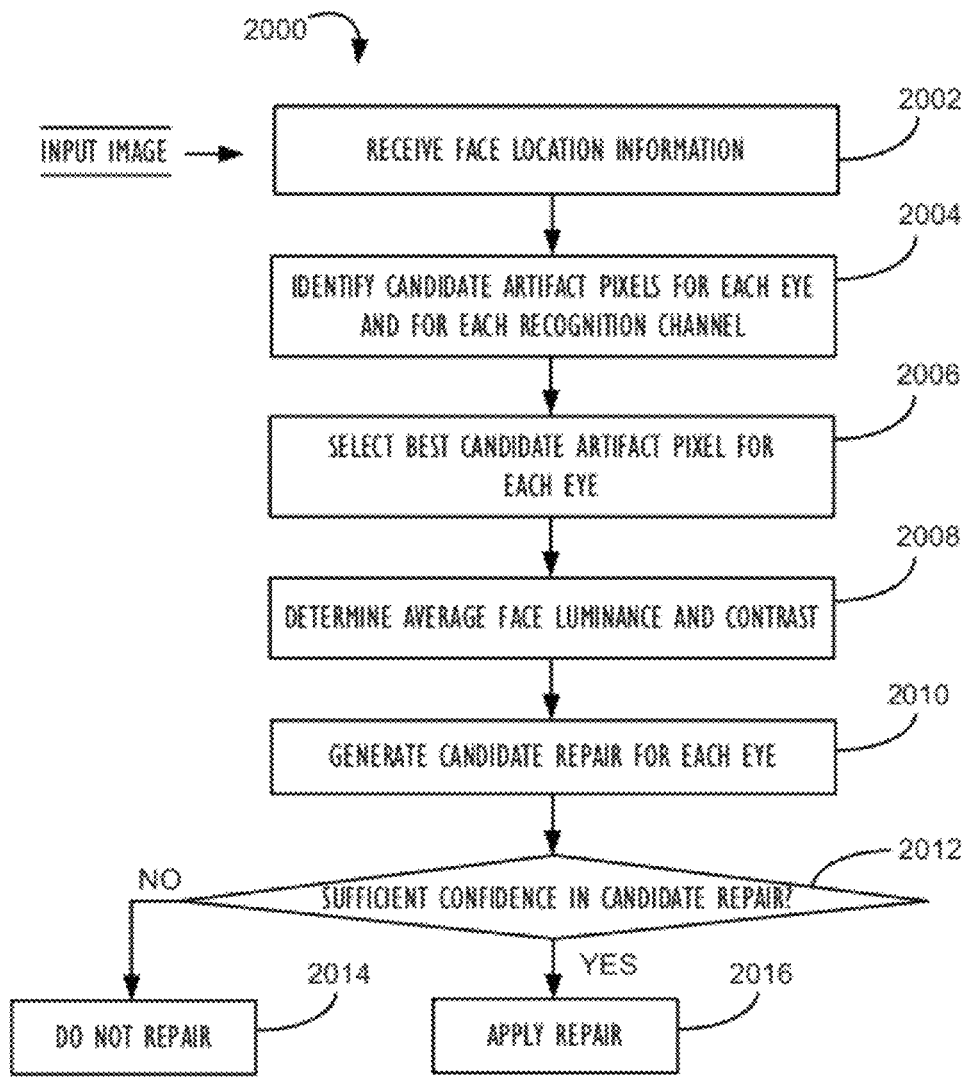
FIG. 20 illustrates a high-level process for automatic red-eye artifact repair, in accordance with one embodiment.

Before describing an illustrative automatic red-eye repair process in detail, it will be described generally with the aid of a flowchart. As such, FIG. 20 illustrates a high-level process 2000 for automatic red-eye artifact repair, in accordance with one embodiment. First, the repair process 2000 receives an input image and corresponding face location information (Step 2002). The face location information may be sent to the repair process 2000 in the form of metadata associated with the input image, or may be generated on the fly via the execution of a facial detection algorithm or the like. Next, the process 2000 may identify candidate artifact pixels for each eye located in the image (Step 2004). In the case of red-eye repair using multiple recognition channels, the candidate artifact pixels may be located for each eye in each of the recognition channels. Next, the best candidate artifact pixel may be chosen for each eye (and for each recognition channel). At this point, the process 2000 may evaluate the average face luminance and contrast values (Step 2008). As will be explained in greater detail below, these values can be used in the calculation of a pupa shade template. At this point, the process 2000 may generate candidate repairs for the best candidate pixel for each eye (Step 2010). The next step in the process 2000 may be to evaluate the confidence in the candidate repair (Step 2012). If there is not sufficient confidence in the repair that was generated (e.g., the repair is too large or too small based on what would be expected from the IOD), then the generated candidate repair will not be made (Step 2014). If instead, there is sufficient confidence in the generated repair at Step 2012, then the candidate repair may be applied (Step 2016). Should there not be sufficient confidence in a generated candidate repair, the candidate repair may be discarded and other possibilities may be tried, such as repairs generated based on the best candidate artifact pixel from a different recognition channel or by lowering thresholds. Thresholds can be important for automatic repair because they can help prevent false positive repairs which may leave an undesirable mark on the image. Thus, lowering the thresholds may only be desirable in repairs where the user has tapped at or near the artifact and where it is thus nearly certain that an artifact exists at or near the location specified.

The following pseudocode describes the overall process of an illustrative automatic red-eye repair operation:

```
find all faces;
for (each face)
{
    extract a bitmap region about the eyes;
    for (red, golden, and white recognition channels)
    {
        extract recognition channel C for region;
        evaluate max. morphology M of C;
        evaluate prominence candidate bitmask containing 1 bits where
        C and M are the same value;
        determine prominence candidate points;
        for (each prominence candidate point p)
        {
            evaluate confidence c of p with respect to the left eye;
            put p with confidence c into left hopper;
            evaluate confidence c of p with respect to the right eye;
            put p with confidence c into right hopper;
        }
    }
    determine best prominence candidate for left eye;
    evaluate average Y value and contrast for face;
    calculate a pupil shade template;
    repair left eye;
    evaluate repair confidence;
    if (confidence too low)
    {
```

-continued

```
        undo left repair;
        try other possibilities;
        if (confidence too low)
            undo left repair;
    }
    repair right eye;
    evaluate repair confidence;
    if (confidence too low)
    {
        undo right repair;
        try other possibilities;
        if (confidence too low)
            undo right repair;
    }
    if (left and right eye are both eyeWhite repairs)
        if (the distance between the repairs < 0.8*IOD)
        {
            undo left repair;
            undo right repair;
        }
}
```

Prominence Search

Figure 21:
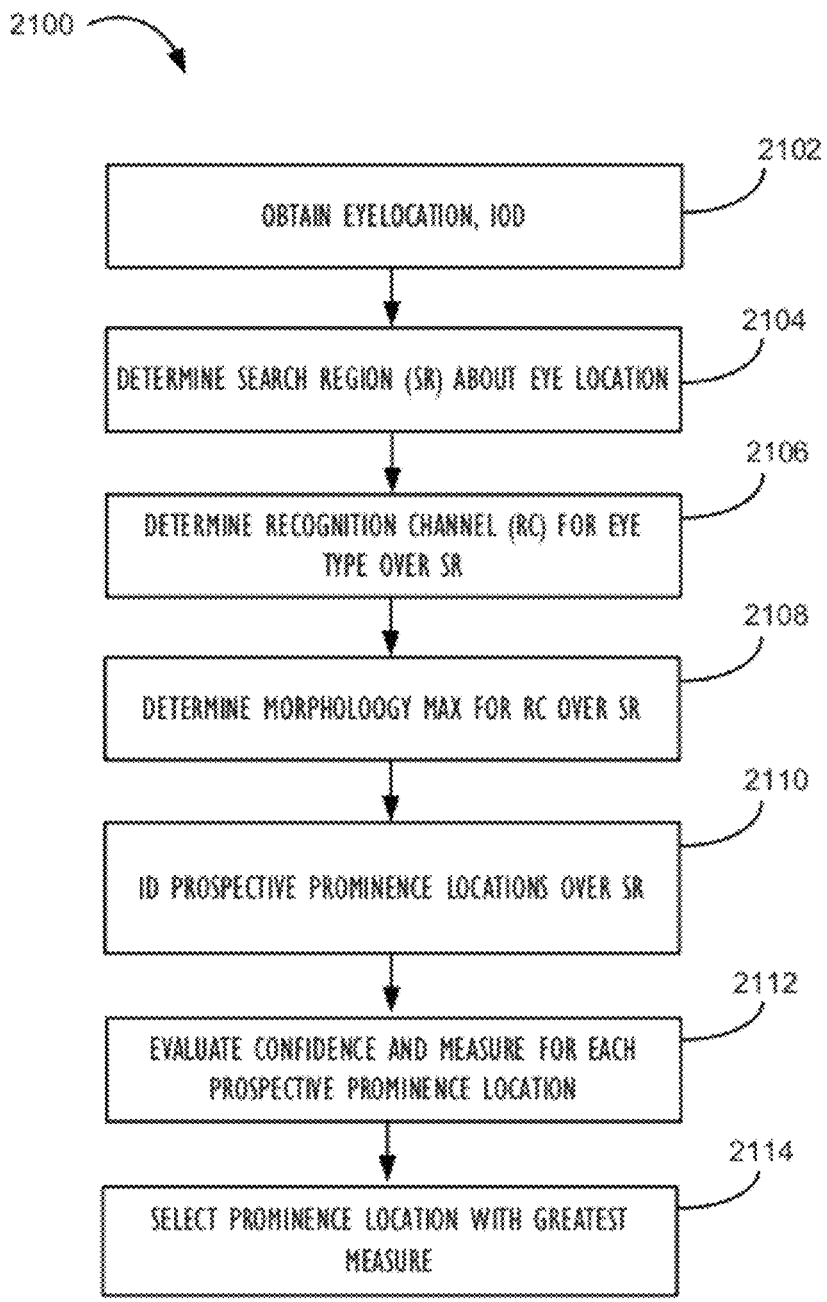
FIG. 21 illustrates a preliminary prominence confidence measurement process for automatic red-eye artifact repair, in accordance with one embodiment.

After extracting a region (e.g., a rectangle) about each eye, padded with sufficient extra space, the following may be done for each eye (i.e., left and right) and for each eye artifact type (e.g., red, golden, and white) as illustrated in FIG. 21, process 2100. First, the eye location and IOD are obtained (Step 2102). A search region SR may then be determined that contains all the pixels within a specified distance of the eye location (Step 2104). The specified distance may be determined by some function of the maximum likely distance to a repair (itself a function of IOD) and the maximum repair size (also a function of IOD). In one embodiment, the distance may be the maximum distance to repair plus the maximum repair size, but other functions may be used. The recognition channel for this eye type over search region SR may then be determined (Step 2106) along with the maximum morphology MM value of recognition channel RC over SR (Step 2108). MM and RC may be used to determine the prospective prominence locations over SR (Step 2110). For each prospective prominence location, a confidence and measure may be determined (Step 2112), and the winning prominence location with the greatest measure selected (Step 2111).

The MM value of the recognition channel RC for a given eye type may be determined in accordance with Step 2108. For each pixel of MM, a window surrounding that corresponding pixel in RC may be examined. The maximum pixel value within that window may be identified and stored into the corresponding pixel location in MM. Prospective prominence locations may be computed over SR using the MM and recognition channel RC for a given eye type as illustrated in Step 2110. A prominence search bit mask PSB may then be determined. In one embodiment, this may be accomplished by comparing each pixel of RC and the corresponding pixel of MM. If they are equal, a 1 may be placed in the PSB; if they are not equal, a 0 may be placed in the PSB. In this implementation, the PSB will contain a 1 in only those locations of the local maxima of RC and a 0 elsewhere. The PSB may be thinned so that each cluster of contiguous bits is narrowed down to a single 1 bit at or near the cluster's centroid. This can be accomplished by examining each bit of the PSB from left-to-right and top-to-bottom. When a 1 bit is encountered, a seed fill search can be performed in the PSB to locate all 1 bits contiguous with the 1 bit that was found. This contiguous set of 1 bits may be replaced with a single 1 bit at or near its centroid. At the end of this process, only single 1 bits remain. The location of each of these 1 bits in the PSB becomes the location of a prospective prominence. As shown in Step 2112, a confidence and a measure may be evaluated for each prospective prominence location.

Automatic Prominence Search

While face detection technology is generally accurate, it may also be inaccurate on occasion due to the inherent nature of image recognition processes. It may be useful, therefore, to measure a large number of faces containing red-eye artifacts that have been detected by a face detector to determine an approximate distance of the artifacts from the detected eye position. This information may be used to create a function which specifies the maximum likely distance to an artifact as a function of the interocular distance (IOD). This function may be employed in automatic prominence search. Using a similar technique, functions for the likely minimum size of a red-eye artifact and the likely maximum size of a red-eye artifact as a function of the IOD may also be generated. These functions can work for all types of red-eye artifacts (e.g., red-, golden-, and white-eye artifacts).

When an eye position (from a face detection operation) and an IOD are received, the determined "maximum likely distance" to an artifact may be used to specify a search region for the prominence that characterizes a red-eye. Within the prominence search region, a maximum morphology MM value may be determined for the recognition channel for the type of artifact being searched for (for instance, the red, golden, or white recognition channel). This value may be compared with the original recognition channel values, pixel for pixel. Those locations where the MM of the recognition channel is equal to the original recognition channel may become the local maxima of the recognition channel; these are the prospective prominence locations. Some function of the likely minimum or maximum red-eye artifact size (for example: 0.75 of the maximum red-eye artifact size) may be used to define a window size for calculation of the MM value. This can give the prospective locations of the prominences, and is likely to include the one that corresponds to the actual red-, golden-, or white-eye artifact, if one is present.

All prospective prominence locations may then be examined. In one embodiment, the maximum value (found at the corresponding spot in the RC) of the prospective prominence may be called maxsample. A small number of outlying recognition channel samples on, for example, a circle at a fixed distance from the prospective prominence location may then be examined (e.g., 10), where the fixed distance can be computed using a function of the likely minimum and maximum red-eye artifact sizes (e.g., ½ the maximum likely red-eye artifact size). The average and range of these outlying recognition channel samples may be used to compute minsample and range respectively.

The normalized HEIGHT of the prominence may be determined by subtracting minsample from maxsample and dividing the result by the maximum allowable sample (e.g., 255 when using 8-bit data). Similarly, the normalized spread of the outlying recognition channel samples may be determined by dividing range by the maximum allowable sample (e.g., 255 when using 8-bit data).

A confidence measure for the prospective prominence may be determined by subtracting half the spread from height. A normalized distance for a prospective prominence may be determined by computing the Cartesian distance of the prospective prominence location from the detected eye position and dividing that distance by the IOD. A measure for the prospective prominence corresponding to its likelihood for being the red-, golden-, or white-eye artifact may then be determined. In one embodiment, a value maxdist may be computed, which can be the maximum likely red-eye artifact distance from the eye location multiplied by the value (1+confidence/2). This action allows brighter, more certain artifacts to be found at a greater distance from the detected eye position. In one embodiment, a multiplier may be evaluated that is 1.0 if distance is less than maxdist, 0.0 if distance is greater or equal to 1.25*maxdist, and linearly interpolated in between. The measure may then be determined to be confidence*multiplier. That prominence having the maximum value of measure may be chosen as the winner for that red-eye artifact type (red-, golden-, or white-eye). (Separate prominence searches for red-eye artifacts, then for golden-eye artifacts, then for white-eye artifacts may be made.)

Once the above actions have been completed for each eye, the confidence values of the winning prominences for each recognition channel may be evaluated in descending order of recognition channel repair priority. For example, one embodiment may give the red recognition channel the highest repair priority, and thus first consider the confidence value of the red-eye winner (if one exists). If its confidence value is greater than, for example, 0.125, that prominence becomes the candidate for repair. If there is no red-eye winner whose confidence exceeds 0.125, then the golden-eye winner may be examined and, if its confidence is greater than 0.125, that prominence becomes the candidate for repair. If there is also no golden-eye winner whose confidence exceeds 0.125, the white-eye winner may be evaluated and, if its confidence is greater than 0.125, that prominence becomes the candidate for repair. This same approach may be used examining only the red-eye and white-eye prominences, for instance.

Returning now to FIG. 19, a prominence search bitmask 1904 is shown corresponding the region of search area 1900 in the image. Each '0' or '1' in the prominence search bitmask 1904 corresponds to a pixel in the input image, with each '1' corresponding to a pixel in the recognition channel that is equal to its maximum morphology value, and thus a potential prominence candidate pixel. In some prominence search bitmasks, prominence candidates dearly correspond with the location of the actual prominences in the image, such as prominence candidate pixels 1908 in FIG. 19. However, in other prominence search bitmasks, there may be many "false positive" prominence candidate pixels, such as prominence candidate pixels 1906 in FIG. 19. These candidate pixels 1906 are local maxima that are likely to be lower in intensity. When a cluster or patch of pixels in the prominence search bitmask all have the same value, it generally indicates that they are the peak of a very low-amplitude prominence, and likely to merely be fluctuations in the signal rather than visually noticeable artifacts.

Since the prominence candidate pixels in the prominence search bitmask tend to duster, sometimes extra processing may be needed to determine single prominence candidate points for the cluster. Processing each bit in the prominence search bitmask, if the bit is set, the bitmask can be seed filled to find the 4-connected closure of 1-bits. This tends to "glue" adjoining 1-bits together into a group of bits. The bit in the group closest to its centroid may then be located and used as the prominence candidate of the group. Pseudocode for this process is presented below:

```
for (all remaining 1 bits in the prominence search bitmask bm)
{
    find the next remaining 1 bit;
    seed fill at this 1 bit to produce the bitmask bm2 of the
    adjoining 4-connected 1 bits;
    compute the 1 bit closest to the centroid of bitmask bm2;
    use this 1 bit as the prominence peak location candidate for
```

-continued

```
    bitmask bm2;
    remove the 1 bits in bitmask bm2 from the prominence search
    bitmask bm;
}
```

Preliminary Prominence Confidence Measures

Exemplary pseudocode for determining level confidence and distance confidence measures follows:

```
#define NCIRCLE 10
void examineOutlying(int x, int y, float radius, float *pMINSAMPLE,
float *pRANGE)
{
    int i, min_s, max_s, sample, total, count, locx, locy;
    min_s = 256; max_s = -1;
    total = 0; count = 0;
    for (i = 0; i < NCIRCLE; i++)
    {
        angle = (2.0 * PI * (float)i) / (float)NCIRCLE;
        locx = x + round(radius * cos(angle));
        locy = y + round(radius * sin(angle));
        clip locx and locy to lie on SR;
        sample = RC[locx, locy];
        if (sample < min_s) min_s = sample;
        if (sample > max_s) max_s = sample;
        total += sample;
        count++;
    }
    *pMINSAMPLE = round((float)total / (float)count);
    *pRANGE = max_s - min_s;
}
float evaluateConfidence(float maxsample, float minsample, float range)
{
    float confidence, spread;
    confidence = (maxsample - minsample) / 255.0;
    if (maxsampie < 8)
        confidence = 0.0;
    else if (maxsample < 16)
        confidence *= (maxsample - 8) * 0.125;
    spread = range / 255.0;
    return confidence - spread * 0.5;
}
void evaluateConfidenceAndMeasure(int x, int y, int eyeX, int eyeY, float
IOD, float radius, float *pCONFIDENCE, float *pMEASURE)
{
    int MINSAMPLE, MAXSAMPLE, RANGE;
    float CONFIDENCE, DISTANCE, MAXDIST, MULTIPLIER;
    MAXSAMPLE = RC[x, y];
    examineOutlying(x, y, radius, &MINSAMPLE, &RANGE);
    CONFIDENCE = evaluateConfidence(MAXSAMPLE,
    MINSAMPLE, RANGE);
    DISTANCE = sqrt((x - eyeX)*(x - eyeX) + (y - eyeY)*(y - eyeY))
    / IOD;
    MAXDIST = upper_repair_distance(IOD) / IOD;
    MAXDIST *= 1.0 + CONFIDENCE * 0.5;
    if (DISTANCE < MAXDIST)
        MULTIPLIER = 1.0;
    else if (DISTANCE < MAXDIST * 1.25)
        MULTIPLIER = 5.0 - (4.0 * DISTANCE) / MAXDIST;
    else
        MULTIPLIER = 0.0;
    *pCONFIDENCE = CONFIDENCE;
    *pMEASURE = CONFIDENCE * MULTIPLIER;
}
```

As noted earner, for each eye location and eye type combination, the best prominence location may be determined by finding the prospective prominence location with the greatest measure value.

As mentioned before, the prominence search may occur for all three eye artifact cases: red, golden, and white. In one embodiment, to select from among the red, golden, and white candidates, red is tested first. Thus, when a red prominence occurs above a certain confidence threshold level, e.g., 0.125, then it is determined to be the chosen repair candidate for the eye. In one embodiment, for each eye red is tested first, then golden, then white. Before proceeding to make the actual repairs, face detection information may be used to extract an average face luminance (Y) value and contrast.

Evaluating Average Face Luminance and Contrast Values

Figure 22:
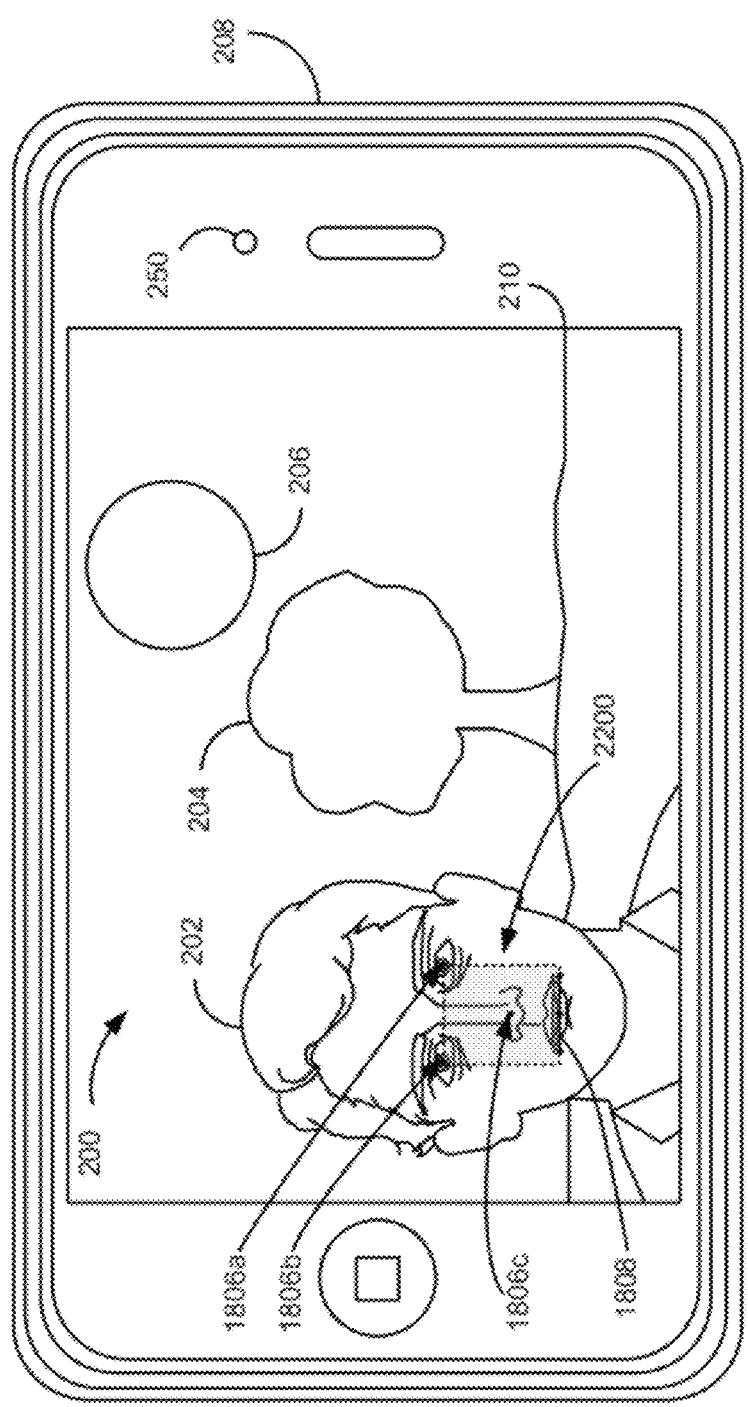
FIG. 22 illustrates an example of the use of face detection to determine an average face luminance and contrast value, in accordance with one embodiment.

To estimate the tonality of the pupil, one of the best measures to have is the average Y (luminance) value of the face. This helps the repair process track the pupil shades when the face is underexposed, normally exposed, or even overexposed. Face detection algorithms typically provide a center for the face, as well as the eye points, mouth points and other face location information. This provides enough information to construct a small quadrilateral, constrained to the center of the face, that may be sampled to determine average Y values. As shown in FIG. 22, this quadrilateral is shaded with diagonal lines and labeled 2200, and it is bounded at the top by both eye points 1806a/1806b and bounded at the bottom by the mouth points 1808, with the center point of the face 1806c at approximately the center of the quadrilateral 2200. Pixels from the Y bitmap inside this quadrilateral 2200 are processed, and a resultant Y histogram is computed. Once the histogram is computed, the average Y level of the face and the contrast may also be computed. The following pseudocode shows how this may be done in one embodiment:

```
set histogram to empty; npixels = 0; total = 0;
for (all pixels Y inside the quadrilateral)
{
    npixels++;
    total += Y;
    histogram[Y]++;
}
average = (float)total / (float)npixels;
sum = 0;
for (i = 0; i < 256; i++)
{
    sum += histogram[i];
    if (sum*200 > npixels)
        break;
}
minsample = i;
sum = 0;
for (i = 255; i >= 0; i--)
{
    sum += histogram[i];
    if (sum*200 > npixels)
        break;
}
maxsample = i;
contrast = maxsample - minsample;
```

In the pseudocode above, the histogram scanning code evaluates the 0.5% and 99.5% levels of the Y values in the face. Their difference is used as the measure of contrast for the face.

Automatic Repair

Once the best prominence candidates for each eye have been located and characterized, repair is then attempted using the same techniques as described with respect to the manual repair operation in Section III above, substituting the location of the determined best candidate prominence peak point as the tap point to the manual repair process. Also, the target pupil shade levels (i.e., tonality) are known at this stage in the automatic repair process, so the manual repair algorithm may be directed to align the resultant pupa shades to those known levels. Furthermore, the kind of artifact (i.e., red, golden, or white) is also known at this stage, so the manual repair algorithm may be directed to concentrate on that eye case. After the repair is accomplished, a "repair confidence measure" may be evaluated for the repair.

Automatic Repair Confidence Measure

Figure 23:
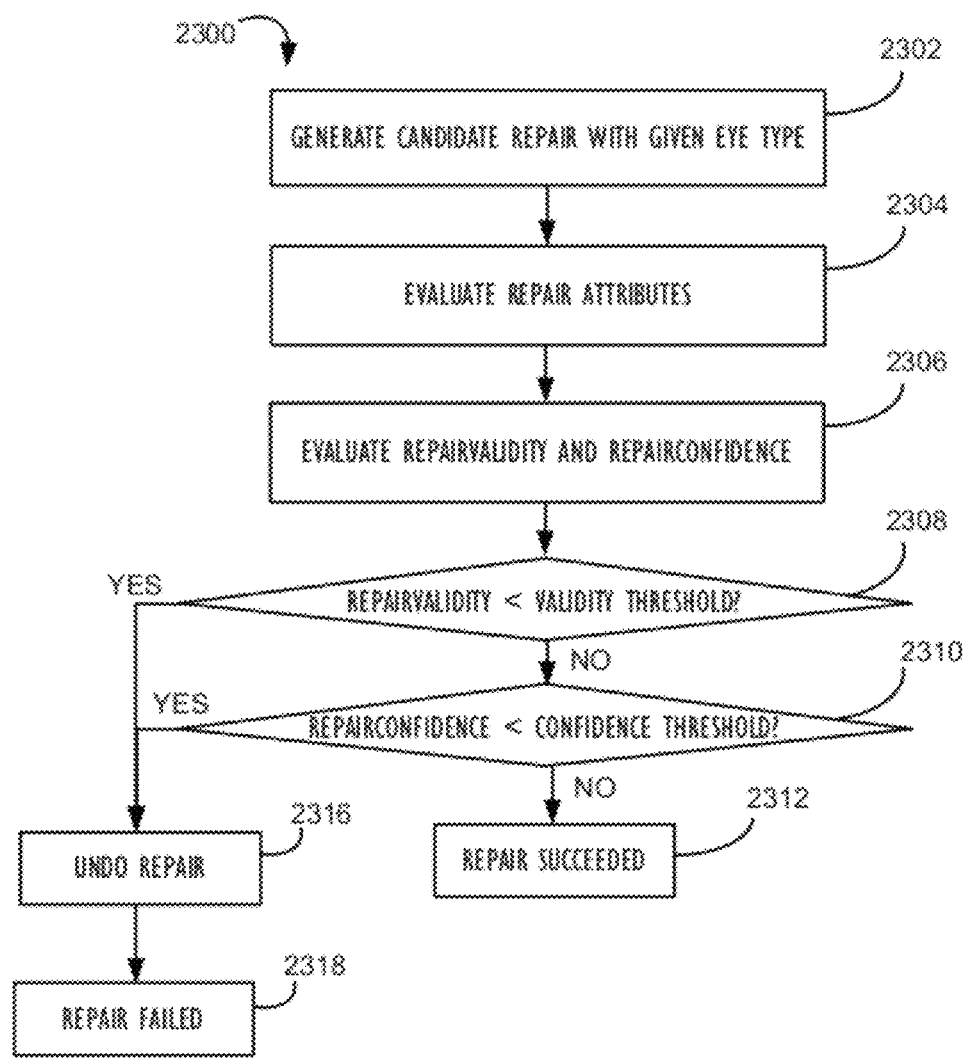
FIG. 23 illustrates a repair validity and confidence measurement process for automatic red-eye artifact repair, in accordance with one embodiment.

Referring now to FIG. 23, a repair validity and confidence measurement process 2300 for automatic red-eye artifact repair is shown in flowchart form, in accordance with one embodiment. After a candidate repair for a given eye type has been generated for the chosen recognition channel (Step 2302), specific attributes of the candidate repair may be evaluated (Step 2304). These attributes may include the size of the repair, the repair strength (e.g., the difference between the prominence maximum value and the values outside the prominence), the average repair contrast (e.g., along the edges of the repair), and the repair distance (e.g., the Cartesian distance in pixels to the eye point location corresponding to the repair divided by the IOD or, in one embodiment, 0.001, whichever is greater). These values may also be evaluated during the repair itself. From these values, repair validity and repair confidence scores may be determined (Step 2306).

The repair size may be determined from the number of pixel (NPIXELS) under the repair alpha mask. In one embodiment, the repairSize parameter my be calculated as:

repairSize=2.0*sqrt(NPIXELS/PI).

The repair strength may be determined from the data calculated for the winning prominence on which the repair is made (MAXSAMPLE and MINSAMPLE). The repair strength may be determined as follows:

repairStrength=(MAXSAMPLE−MINSAMPLE)/ 255.0.

The average repair contrast may be determined when the bitmask is grown using repeated seed fills. A method for computing average repair contrast is presented above.

In one embodiment, the repair distance may be the Cartesian distance of the centroid (CX, CY) of the repair from the eye location (EX, EY), obtained from the face detector, divided by the IOD as follows:

repairDistance=sqrt((EX−CX)*(EX−CX)+(EY−CY)*(EY−CY))/IOD;

From these values, the repairValidity may be determined as repairValidity= (repairStrength*averageRepairContrast)/max(repairDistance,0.001).

If the repair validity is less than a threshold (e.g., 0.2) (the "YES" prong of Step 2308), the repair may be undone (Step 2316) as the repair may be considered "wrong." This can happen, for example, when the repair was made to a piece of skin rather than a red-eye artifact. If the repair validity is greater than or equal to the threshold (the "NO" prong of Step 2308), a repairConfidence may be calculated based on the gathered parameters. (The repairConfidence can be used to prevent repairs that are not of an appropriate size from being made.) In one embodiment, repairConfidence may be determined in accordance with the following pseudocode:

```
repairConfidence = repairStrength;
if (eyeType == red)
    repairConfidence *= 1.5;
if (repairConfidence < 0.25)
    repairConfidence = 0.0;
else
{
    if (repairSize > maxRepairSize)
    {
        if (eyeType == red && repairSize < maxRepairSize +
            repairSize*repairConfidence*0.36)
                multiplier = 1.0;
        else if (eyeType == white && repairSize < maxRepairSize +
            repairSize*repairConfidence*0.26)
                multiplier = 1.0;
        else
            multiplier = 0.0;
    }
    else if (repairSize > minRepairSize)
        multiplier = 1.0;
    else
    {
        if (eyeType == red && repairSize > minRepairSize −
            repairSize*repairConfidence*0.36)
                multiplier = 1.0;
        else
            multiplier = 0.0;
    }
}
repairConfidence *= multiplier;
```

If the repairConfidence is less than a given confidence threshold (e.g., 0.15) (the "YES" prong of Step 2310), the repair may be undone (Step 2316). If the repairConfidence is greater than or equal to the given threshold (the "NO" prong of Step 2310), this means the repair for the selected recognition channel was successful (e.g., red-, golden- or white-eye). If the repair is undone for any reason, e.g., via the "YES" prongs of steps 2308 or 2310 (Step 2316), a check may be made to determine if all eye types (e.g., red, golden and white) have been evaluated.

Both eyes may be repaired according to the process outlined in FIG. 23. In some embodiments, an optional final measure may be employed if there is sufficient confidence in the candidate repair. For example, if the repairs for the two eyes are closer than some portion of the interocular distance (IOD) to each other, e.g., 0.8, and both eyes are white eye cases, it has been found beneficial to cancel both repairs. If the dual white eye condition is not met, the candidate repair may be applied to the image. This extra check can help to eliminate the image case where the two sclera areas closest to the nose are identified as the repair locations for the two eyes. In practice, it has been found that it is more important to avoid making improper repairs than it is to repair all possible defects. In automatic repair embodiments relying upon face detection, if face detection does not identify a face, the automatic repair methodology cannot repair an artifact. This overall process may be orchestrated as shown in the following pseudocode:

```
Attempt repair with left eye location using eye type of red
If (that fails)
    attempt repair with left eye location using eye type of white
Attempt repair with right eye location using eye type of red
If (that fails)
    attempt repair with right eye location using eye type of white
If (both eyes were repaired and if they were both white and if they
are too close to each other)
    cancel both repairs by undoing them.
```

Another aspect of the automatic repair process described herein is that the eye points located by the face detection algorithm are not simply used without modification as the "tap points" and then fed to the manual repair process (although this would seem to be the naïve or obvious choice). This is because it has been empirically determined that the eye points located by face detection algorithms often do not accurately identify the location of red-eye artifacts. In certain images, incorrectly basing the determination of the prominence location solely on the eye positions returned by the face detection algorithm would generate "false positive" repairs, thus significantly harming the user experience.

Representative Device

Figure 24:
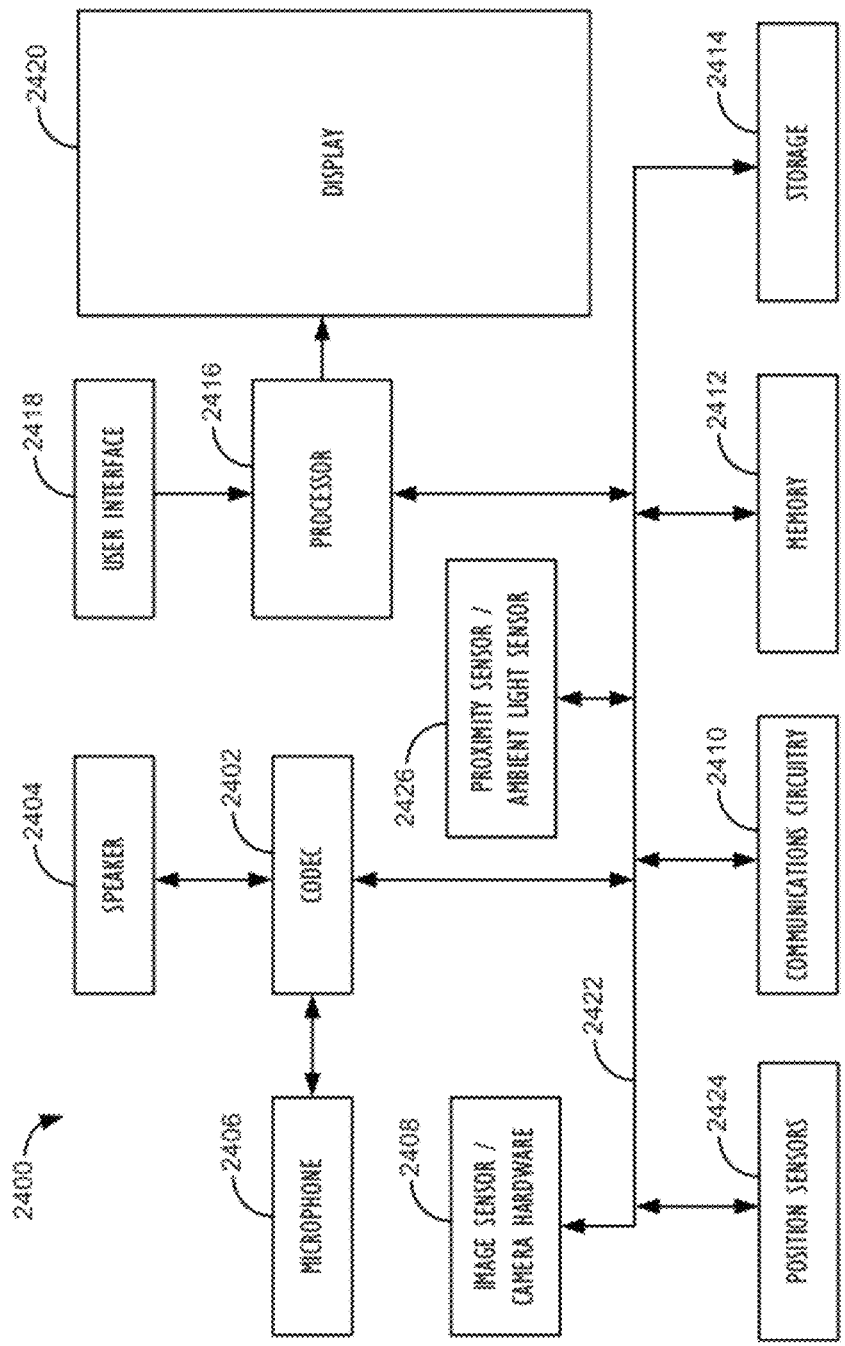
FIG. 24 illustrates a simplified functional block diagram of a device possessing a display, in accordance with one embodiment.

Referring now to FIG. 24, a simplified functional block diagram of a representative electronic device possessing a display 2400 according to an illustrative embodiment, e.g., camera device 208, is shown. The electronic device 2400 may include a processor 2416, display 2420, proximity sensor/ambient light sensor 2426, microphone 2406, audio/video codecs 2402, speaker 2404, communications circuitry 2410, position sensors 2424, image sensor with associated camera hardware 2408, user interface 2424, memory 2412, storage device 2414, and communications bus 2422. Processor 2416 may be any suitable programmable control device and may control the operation of many functions, such as the touch screen operations, as well as other functions performed by electronic device 2400. Processor 2416 may drive display 2420 and may receive user inputs from the user interface 2418. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

Storage device 2414 may store media (e.g., image and video files), software (e.g., for implementing various functions on device 2400), preference information, device profile information, and any other suitable data. Storage device 2414 may include one more storage mediums, including for example, a hard-drive, permanent memory such as ROM.

Memory 2412 may include one or more different types of memory which may be used for performing device functions. For example, memory 2412 may include cache, ROM, and/or RAM. Communications bus 2422 may provide a data transfer path for transferring data to, from, or between at least storage device 2414, memory 2412, and processor 2402. User interface 2418 may allow a user to interact with the electronic device 2400. For example, the user input device 2410 can take a variety of forms, such as a button, keypad, dial, a click wheel, or a touch screen.

In one embodiment, the personal electronic device 2400 may be a electronic device capable of processing and displaying media such as image and video files. For example, the personal electronic device 2400 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicant. As one example, although the present disclosure focused on touch screen display screens, it will be appreciated that the teachings of the present disclosure can be applied to other implementations, such as stylus-operated display screens or desktop computers. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. An automatic artifact repair method, comprising:
    receiving face location information for a face in an image, the face location information comprising two eye points, the image stored in a memory;
    automatically identifying a candidate artifact for a first eye in the face based at least in part on evaluation of at least one of a plurality of recognition channels for the first eye, wherein the first eye is associated with a first of the two eye points, and wherein each recognition channel comprises a monochrome extraction from the image designed to make one kind of artifact exhibit maximum contrast;
    automatically generating a candidate repair for the candidate artifact based, at least in part, on the face location information, wherein the candidate repair comprises repair information for a first plurality of pixels comprising the identified candidate artifact for the first eye;
    automatically determining a confidence measure for the candidate repair based, at least in part, on at least one of the following: a size of the candidate repair, a strength of the candidate repair, a contrast of the candidate repair, and the face location information;
    automatically applying the candidate repair to the image stored in the memory if the confidence measure is greater than a threshold value; and
    automatically rejecting the candidate repair if the confidence measure is less than the threshold value.

2. The method of claim 1, wherein the act of receiving face location information further comprises determining an interocular distance (IOD) between the two eye points.

3. The method of claim 2, wherein the act of receiving face location information further comprises determining a region around the two eye points based at least in part on the interocular distance, the region including a plurality of pixels.

4. The method of claim 3, wherein the act of receiving face location information further comprises determining a minimum size and a maximum size for an artifact based at least in part on the interocular distance.

5. The method of claim 4, wherein the act of identifying a candidate artifact for a first eye further comprises:
    evaluating a first recognition channel of the plurality of recognition channels, the first recognition channel having a value for each of the plurality of pixels in the region; and
    determining whether each value in the first recognition channel is a local maximum.

6. The method of claim 5, wherein the act of identifying a candidate artifact for a first eye further comprises generating a candidate prominence bitmask having a plurality of values, wherein each value in the candidate prominence bitmask has a corresponding value in the first recognition channel.

7. The method of claim 6, wherein the act of identifying a candidate artifact for a first eye further comprises identifying a single prominence candidate pixel.

8. The method of claim 1, wherein the act of automatically generating a candidate repair comprises determining a pupil tonality for the candidate repair.

9. The method of claim 1, wherein the act of automatically generating the candidate repair comprises generating the candidate repair in a second memory, and wherein the act of automatically applying the candidate repair comprises copying the repair generated in the second memory into the region of the memory corresponding to the repair.

10. The method of claim 1, wherein the act of automatically rejecting further comprises:
    repeating the acts of automatically identifying, automatically generating, automatically determining and automatically applying,
    wherein the candidate artifact was originally identified in a first one of the plurality of recognition channels, and
    wherein the repeated act of automatically identifying takes place in a second one of the plurality of recognition channels.

11. A non-transitory program storage device, readable by a programmable control device, comprising instructions stored thereon for causing the programmable control device to perform the method of claim 1.

12. A non-transitory program storage device, readable by a programmable control device, comprising instructions stored thereon for causing the programmable control device to perform an automatic artifact repair method, comprising the acts of:
receiving face location information for a face in an image, the face location information comprising two eye points, the image stored in a memory;
automatically identifying a candidate artifact for a first eye in the face based at least in part on evaluation of at least one of a plurality of recognition channels for the first eye, wherein the first eye is associated with a first of the two eye points, and wherein each recognition channel comprises a monochrome extraction from the image designed to make one kind of artifact exhibit maximum contrast;
automatically generating a candidate repair for the candidate artifact based, at least in part, on the face location information, wherein the candidate repair comprises repair information for a first plurality of pixels comprising the identified candidate artifact for the first eye;
automatically determining a confidence measure for the candidate repair based, at least in part, on at least one of the following: a size of the candidate repair, a strength of the candidate repair, a contrast of the candidate repair, and the face location information;
automatically determining a validity measure for the candidate repair based, at least in part, on the face location information;
automatically applying the candidate repair to the image stored in the memory if the confidence measure is greater than a confidence threshold value and the validity measure is greater than a validity threshold value; and
automatically rejecting the candidate repair if either the confidence measure is less than the confidence threshold value or the validity measure is less than the validity threshold value.

13. The non-transitory program storage device of claim 12, wherein the act of receiving face location information further comprises determining an interocular distance (IOD) between the two eye points.

14. The non-transitory program storage device of claim 13, wherein the act of receiving face location information further comprises determining a region around the two eye points based at least in part on the interocular distance, the region including a plurality of pixels.

15. The non-transitory program storage device of claim 12, wherein the act of automatically rejecting further comprises:
repeating the acts of automatically identifying, automatically generating, automatically determining a confidence measure, automatically determining a validity measure, and automatically applying the candidate repair,
wherein the candidate artifact was originally identified in a first one of the plurality of recognition channels, and
wherein the repeated act of automatically identifying takes place in a second one of the plurality of recognition channels.

16. The non-transitory program storage device of claim 12, wherein the validity measure for the candidate repair comprises at least one of the following: a repair size value, a repair strength value, an average repair contrast value, and a repair distance from corresponding eye point value.

17. An automatic artifact repair method, comprising:
receiving face location information for a face in an image, the face location information comprising two eye points and an interocular distance (IOD), the image stored in a memory;
automatically determining a search region around one of the two eye points;
determining a plurality of recognition channels over the search region wherein each recognition channel comprises a monochrome extraction from the image designed to make one kind of artifact exhibit maximum contrast;
automatically identifying prospective prominence locations over the search region for each of the plurality of recognition channels;
automatically evaluating a measure for each of the prospective prominence locations in each of the plurality of recognition channels;
automatically selecting the prominence location with the greatest measure for a first one of the plurality of recognition channels;
automatically generating a first candidate repair for the selected prominence location from the first recognition channel, wherein the first candidate repair comprises repair information for a first plurality of pixels comprising the selected prominence location from the first recognition channel;
automatically determining a first confidence measure for the first candidate repair based, at least in part, on at least one of the following: a size of the candidate repair, a strength of the candidate repair, a contrast of the candidate repair, and the face location information;
automatically applying the first candidate repair to the image stored in the memory if the first confidence measure is greater than a first threshold value; and
automatically rejecting the first candidate repair if the first confidence measure is less than the first threshold value.

18. The method of claim 17, wherein the act of automatically rejecting the first candidate repair further comprises:
automatically selecting the prominence location with the greatest measure for a second one of the plurality of recognition channels;
automatically generating a second candidate repair for the selected prominence location from the second recognition channel;
automatically determining a second confidence measure for the second candidate repair;
automatically applying the second candidate repair to the image stored in the memory if the second confidence measure is greater than a second threshold value; and
automatically rejecting the second candidate repair if the second confidence measure is less than the second threshold value.

19. The method of claim 18, wherein the first recognition channel has a higher repair priority than the second recognition channel.

20. A non-transitory program storage device, readable by a programmable control device, comprising instructions stored thereon for causing the programmable control device to perform the method of claim 17.

21. A non-transitory program storage device, readable by a programmable control device, comprising instructions stored thereon for causing the programmable control device to perform an automatic artifact repair method, comprising:

receiving face location information for a face in an image, the face location information comprising two eye points, the image representing a physical scene, the image stored in a first memory;

determining face information based on the face location information;

automatically identifying a first plurality of candidate artifacts for a first eye in the face based at least in part on the face information, wherein each of the first plurality of candidate artifacts is based on a different recognition channel, wherein the first eye is associated with a first of the two eye points, and wherein each recognition channel comprises a monochrome extraction from the image designed to make one kind of artifact exhibit maximum contrast;

automatically selecting a first candidate artifact from the first plurality of candidate artifacts;

automatically generating a first candidate repair based on the first candidate artifact and, at least in part, on the face information, wherein the first candidate repair comprises repair information for a first plurality of pixels comprising the first candidate artifact;

automatically determining a first confidence measure for the first candidate repair based, at least in part, on at least one of the following: a size of the first candidate repair, a strength of the first candidate repair, a contrast of the first candidate repair, and the face information;

automatically updating the image stored in the first memory to apply the first candidate repair if the first confidence measure is greater than a first threshold value; and automatically rejecting the first candidate repair if the first confidence measure is less than the first threshold value.

22. The non-transitory program storage device of claim 21, wherein the act of determining face information comprises determining an interocular distance from the face location information.

23. The non-transitory program storage device of claim 21, wherein the first plurality of recognition channels comprise at least two of a red recognition channel, a golden recognition channel and a white recognition channel.

24. The non-transitory program storage device of claim 21, wherein the act of automatically generating a first candidate repair comprises automatically generating a first candidate repair in a second memory, wherein the first memory is distinct from the second memory.

25. The non-transitory program storage device of claim 24, wherein the act of automatically updating the image stored in the first memory comprises automatically copying the generated first candidate repair from the second memory to the first memory.

26. The non-transitory program storage device of claim 21, wherein the act of automatically rejecting the first candidate repair comprises:

automatically selecting a second candidate artifact from the first plurality of candidate artifacts;

automatically generating a second candidate repair based on the second candidate artifact and, at least in part, on the face information;

automatically determining a second confidence measure for the second candidate repair based, at least in part, on the face information;

automatically updating the image stored in the first memory to apply the second candidate repair if the first confidence measure is greater than a first threshold value; and automatically rejecting the second candidate repair if the second confidence measure is less than the first threshold value.

27. The non-transitory program storage device of claim 21, wherein the act of automatically generating a first candidate repair comprises:

determining a pupil shade for the first eye; and automatically generating a first candidate repair based, at least in part, on the pupil shade.

28. The non-transitory program storage device of claim 21, wherein the act of automatically identifying a first plurality of candidate artifacts comprises, for each recognition channel:

automatically identifying a plurality of potential candidate artifact points;

automatically determining a confidence value for each of the plurality of potential candidate artifact points; and automatically selecting that potential candidate artifact point having the highest confidence value.

* * * * *